(12) United States Patent
Fujio et al.

(10) Patent No.: US 12,391,486 B2
(45) Date of Patent: Aug. 19, 2025

(54) TRAY AND TRANSPORT FACILITY

(71) Applicant: Daifuku Co., Ltd., Osaka (JP)

(72) Inventors: Yoshihiko Fujio, Hinocho (JP); Takuya Isomura, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 195 days.

(21) Appl. No.: 18/023,197

(22) PCT Filed: May 28, 2021

(86) PCT No.: PCT/JP2021/020392
§ 371 (c)(1),
(2) Date: Feb. 24, 2023

(87) PCT Pub. No.: WO2022/044463
PCT Pub. Date: Mar. 3, 2022

(65) Prior Publication Data
US 2023/0303332 A1    Sep. 28, 2023

(30) Foreign Application Priority Data
Aug. 28, 2020 (JP) ................................. 2020-144739

(51) Int. Cl.
*B65G 17/32* (2006.01)
*B65G 17/06* (2006.01)
(Continued)

(52) U.S. Cl.
CPC ........... *B65G 17/34* (2013.01); *B65G 17/066* (2013.01); *B65G 17/22* (2013.01);
(Continued)

(58) Field of Classification Search
CPC ...... B65G 17/066; B65G 17/22; B65G 17/32; B65G 17/34; B65G 21/2072; B65G 39/18; B65G 39/20
(Continued)

(56) References Cited

U.S. PATENT DOCUMENTS 4,216,845 A * 8/1980 Tashman ................. A47F 10/06
186/49
4,274,886 A * 6/1981 Noren .................... A47L 15/247
134/32
(Continued)

FOREIGN PATENT DOCUMENTS

CN        109160251 A    1/2019
EP        1452465 A1     9/2004
(Continued)

*Primary Examiner* — Douglas A Hess
(74) *Attorney, Agent, or Firm* — The Webb Law Firm

(57) ABSTRACT

An upper surface of a main body section (10) is used as a placement surface (11) on which an article is placeable. The main body section (10) includes an intermediate section (12), a front section (13) adjacent to the intermediate section (12) on a front side (X1) in a front-rear direction (X), and a rear section (14) adjacent to the intermediate section (12) on a rear side (X2) in the front-rear direction (X). The intermediate section (12) is rectangular in a plan view, the front section (13) is shaped as a trapezoid that becomes smaller in a width direction (Y) while extending toward the front side (X1) in a plan view, and the rear section (14) is shaped as a trapezoid that becomes smaller in the width direction (Y) while extending toward the rear side (X2) in a plan view.

14 Claims, 9 Drawing Sheets

(51) Int. Cl.
  *B65G 17/22* (2006.01)
  *B65G 17/34* (2006.01)
  *B65G 21/20* (2006.01)
  *B65G 39/18* (2006.01)
  *B65G 39/20* (2006.01)

(52) U.S. Cl.
  CPC ......... *B65G 21/2072* (2013.01); *B65G 39/18* (2013.01); *B65G 39/20* (2013.01)

(58) Field of Classification Search
  USPC .......................................................... 198/793
  See application file for complete search history.

(56) References Cited

U.S. PATENT DOCUMENTS

| | | | |
|---|---|---|---|
| 4,418,817 A * | 12/1983 | Martin | B65G 39/20 198/845 |
| 5,144,790 A * | 9/1992 | Tisma | B65B 39/14 53/251 |
| 5,326,021 A | 7/1994 | Farrell et al. | |
| 6,003,444 A * | 12/1999 | Perry, Jr. | A47L 15/247 105/157.1 |
| 7,025,195 B2 | 4/2006 | Brixius et al. | |
| 9,950,828 B2 | 4/2018 | Fujio et al. | |
| 10,577,193 B1 * | 3/2020 | Erceg | B65G 47/962 |
| 10,981,729 B2 * | 4/2021 | Deuser | B65G 21/20 |
| 2006/0054471 A1 | 3/2006 | Maeda | |
| 2012/0012438 A1 | 1/2012 | Heitplatz | |
| 2014/0308410 A1 | 10/2014 | Marechal | |
| 2024/0253906 A1 * | 8/2024 | Tobayama | |

FOREIGN PATENT DOCUMENTS

| | | | | |
|---|---|---|---|---|
| EP | 3070020 A1 * | 9/2016 | | B64F 1/368 |
| JP | 6293334 A | 10/1994 | | |
| JP | 201116604 A | 1/2011 | | |
| JP | 2014105008 A | 6/2014 | | |
| JP | 201593726 A | 5/2015 | | |
| JP | 2019177981 A | 10/2019 | | |
| WO | 2004026734 A1 | 4/2004 | | |
| WO | WO-2023097351 A2 * | 6/2023 | | B65D 1/34 |

* cited by examiner

TRAY AND TRANSPORT FACILITY

CROSS-REFERENCE TO RELATED APPLICATIONS

This application is the United States national phase of International Application No. PCT/JP2021/020392 filed May 28, 2021, and claims priority to Japanese Patent Application No. 2020-144739 filed Aug. 28, 2020, the disclosures of which are hereby incorporated by reference in their entireties.

BACKGROUND OF THE INVENTION

Field of the Invention

The present invention relates to a tray that has a plate-shaped body section and is transported along a transport route by a transport device, and also relates to a transport facility that includes the tray and the transport device.

Description of Related Art

An example of the aforementioned tray is disclosed in JP 2019-177981A (Patent Document 1). The reference numerals shown in parentheses in the following description of the background art are the reference numerals used in Patent Document 1. Patent Document 1 discloses a tray (40) that is transported along a transport route by a transport device (100). As shown in FIG. 1 of Patent Document 1, the transport device (100) transports the tray (40) by driving circumferentially outward driving rollers (10) and circumferentially inward driving rollers (20) in a curved route section, which is curved in a plan view, of a transport route. According to Patent Document 1, with this configuration of the transport device (10), the tray (40) can be smoothly transported along the curved route section.

Patent Document

Patent Document 1: JP 2019-177981A

As described in paragraph 0005 of Patent Document 1 as well, the aforementioned tray is used for loading and transporting baggage at an airport, for example. When transporting an article such as a piece of baggage on a tray, an elongated article such as a golf bag can be transported more easily by using a tray that has a long total length (length in the direction along the transport route). However, if the total length of the tray is simply increased, the radial width of the tray movement locus (difference between the inner diameter and the outer diameter of the movement locus) in the curved route section correspondingly increases. This therefore may result in an increase in the size of the transport device that transports the tray in the curved route section. Also, it is conceivable to add a tray with an increased total length (hereinafter referred to as the "first tray") to an existing facility for transporting a tray with a shorter total length than the first tray (hereinafter referred to as the "second tray"). In this case, in order for the transport device for transporting the second tray to be able to be used as-is or without a substantial modification, it is desirable that the first tray can be transported as close as possible to the movement locus of the second tray in the curved route section. However, if the radial width of the movement locus of the first tray in the curved route section is increased a large amount due to increasing the total length of the first tray, it is difficult to transport the first tray close to the movement locus of the second tray. Note that Patent Document 1 does not contain any description at all regarding increasing the total length of the tray or a problem that may arise in such a case.

SUMMARY OF THE INVENTION

In view of the foregoing, there is desire for a technique that enables increasing the total length of the tray while also suppressing the extent of an increase in the radial width of the movement locus of the tray in the curved route section.

A tray according to an aspect of the present disclosure is a tray configured to be transported along a transport route by a transport device, the tray including: a main body section that is plate-shaped, wherein with a front-rear direction being a direction along the transport route, and a width direction being a direction intersecting the front-rear direction in a plan view, the transport route includes a curved route section shaped as a curved line in a plan view, the transport device includes a pair of guide walls in at least the curved route section, the guide walls each extending along a corresponding edge, with respect to the width direction, of the transport route and including a guiding surface facing inward in the width direction, the main body section has an upper surface used as a placement surface on which an article is placeable, the main body section includes: an intermediate section; a front section adjacent to the intermediate section on a front side in the front-rear direction; and a rear section adjacent to the intermediate section on a rear side in the front-rear direction, the intermediate section is rectangular in a plan view, the front section is shaped as a trapezoid that becomes smaller in the width direction while extending toward the front side in a plan view, and the rear section is shaped as a trapezoid that becomes smaller in the width direction while extending toward the rear side in a plan view.

According to this configuration, the intermediate section is rectangular in a plan view, thus making it possible to appropriately ensure the placement surface for placement of an article. Also, according to this configuration, both the front section and the rear section are shaped as a trapezoid that becomes smaller in the width direction while extending toward the leading end side in the front-rear direction in a plan view, and therefore the radial width of the movement locus of the tray in the curved route section can be kept smaller than in the case where the front section and the rear section are rectangular in a plan view. Accordingly, it is possible to increase the total length of the tray while keeping a low extent of increase in the radial width of the movement locus of the tray in the curved route section. Note that in this configuration, the movement of the tray in the curved route section can be guided by the guide walls of the transport device, but by keeping a small radial width for the movement locus of the tray in the curved route section, it is also possible to keep a small distance between the guide walls in the width direction and suppress an increase in the size of the transport device.

Further features and advantages of the tray will become clear from the following description of the embodiments given with reference to the drawings.

DESCRIPTION OF THE INVENTION

The following describes embodiments of a tray and a transport facility with reference to the drawings. The following description is given by way of an example in which a first tray, which is a tray according to the present disclosure, is added to a transport facility for transporting a second tray having a shorter total length than the first tray. In the present embodiment, a first tray 1 corresponds to the tray according to the present disclosure.

Figure 1:
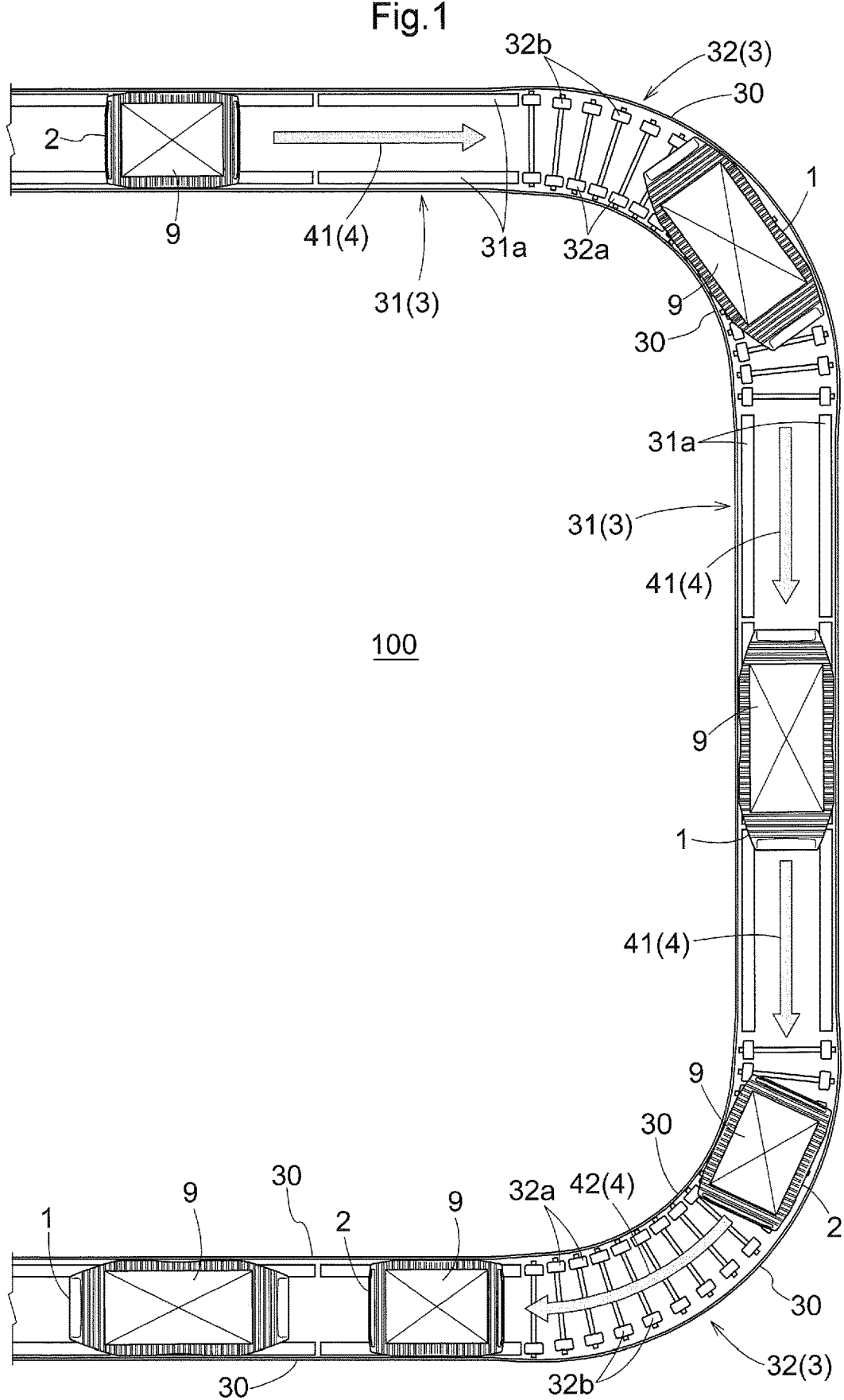
FIG. 1 is a plan view of part of a transport facility.
Figure 2:
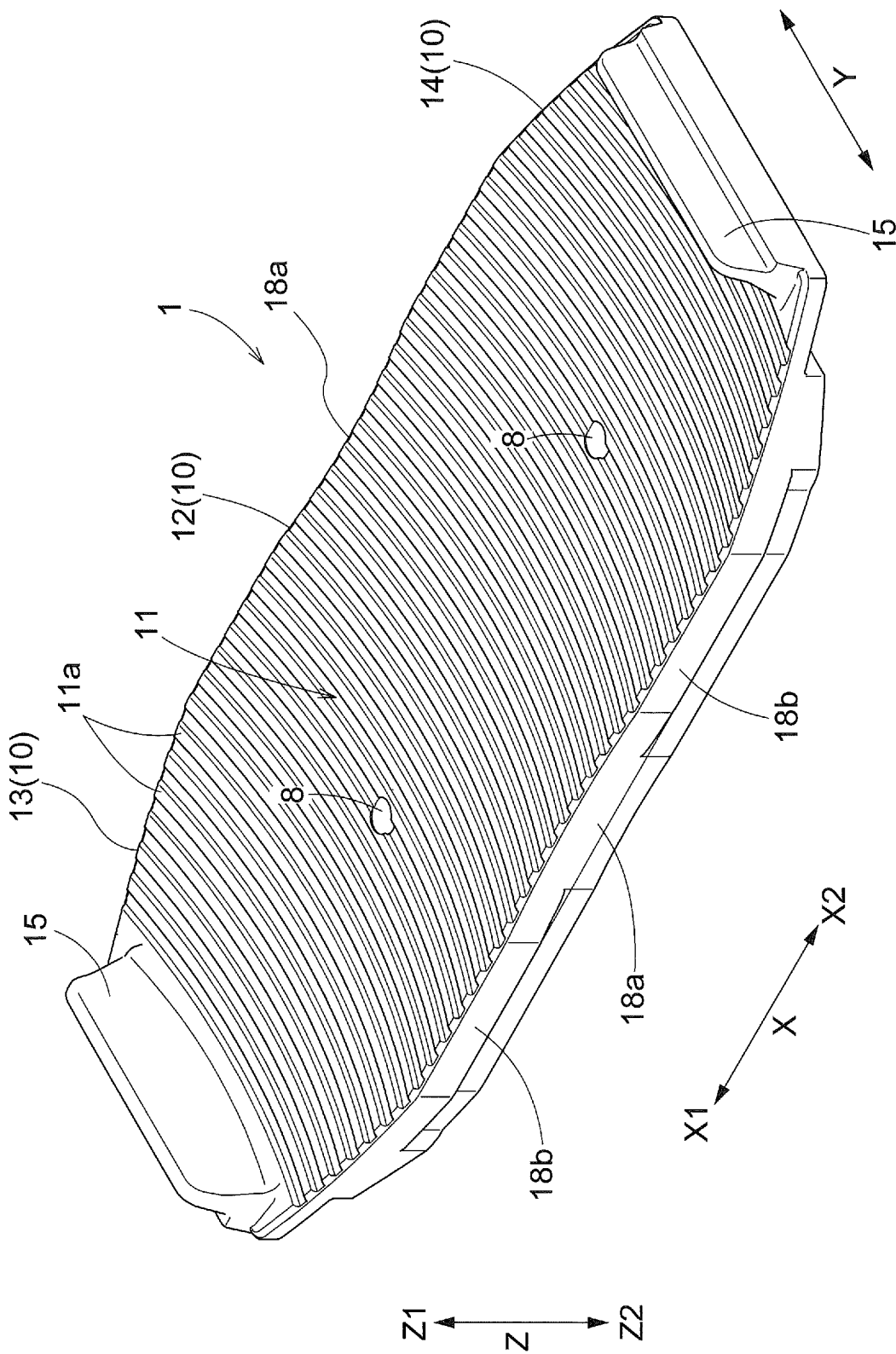
FIG. 2 is a perspective view of a first tray as viewed obliquely from above.
Figure 3:
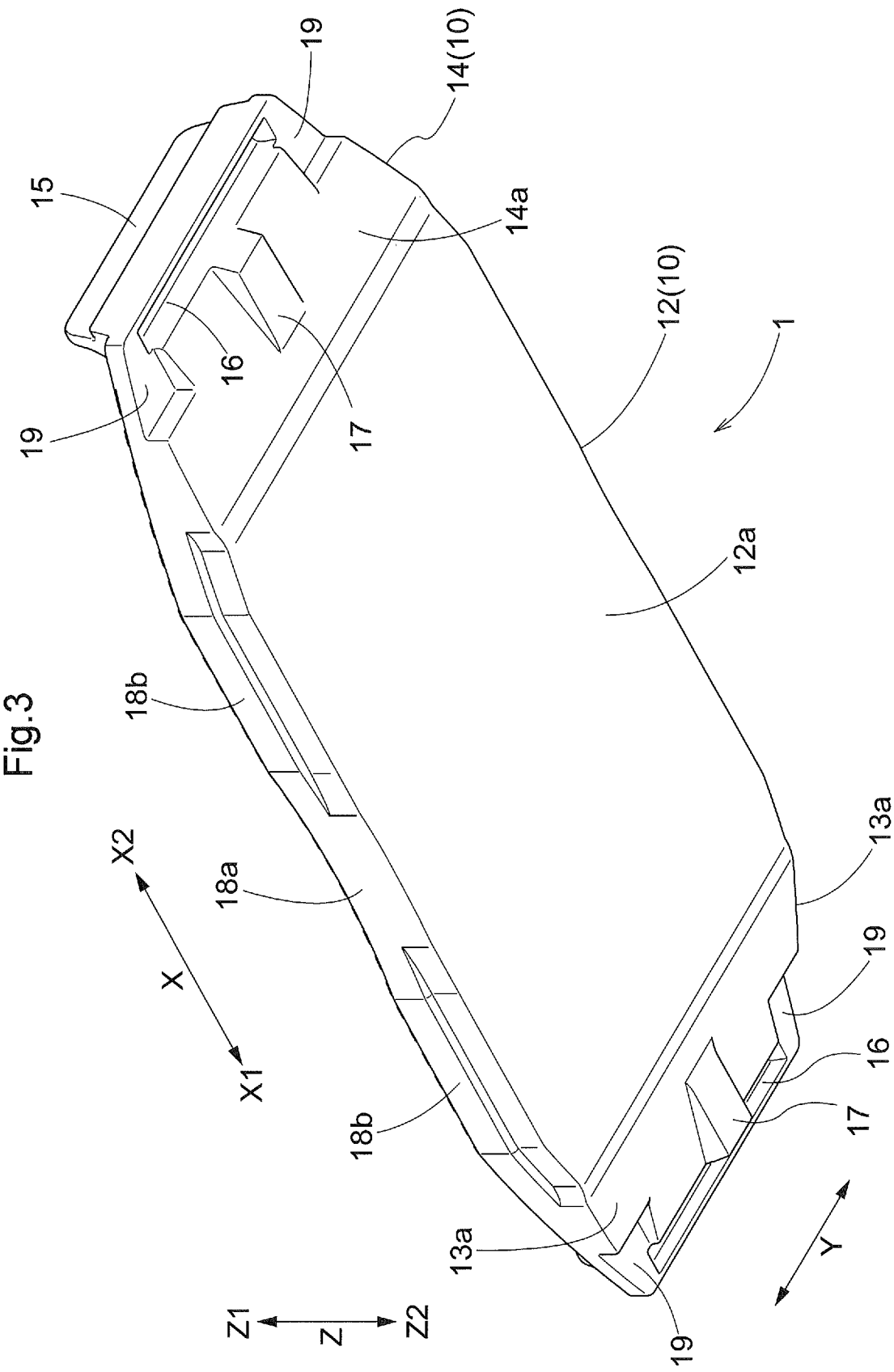
FIG. 3 is a perspective view of the first tray as viewed obliquely from below.
Figure 4:
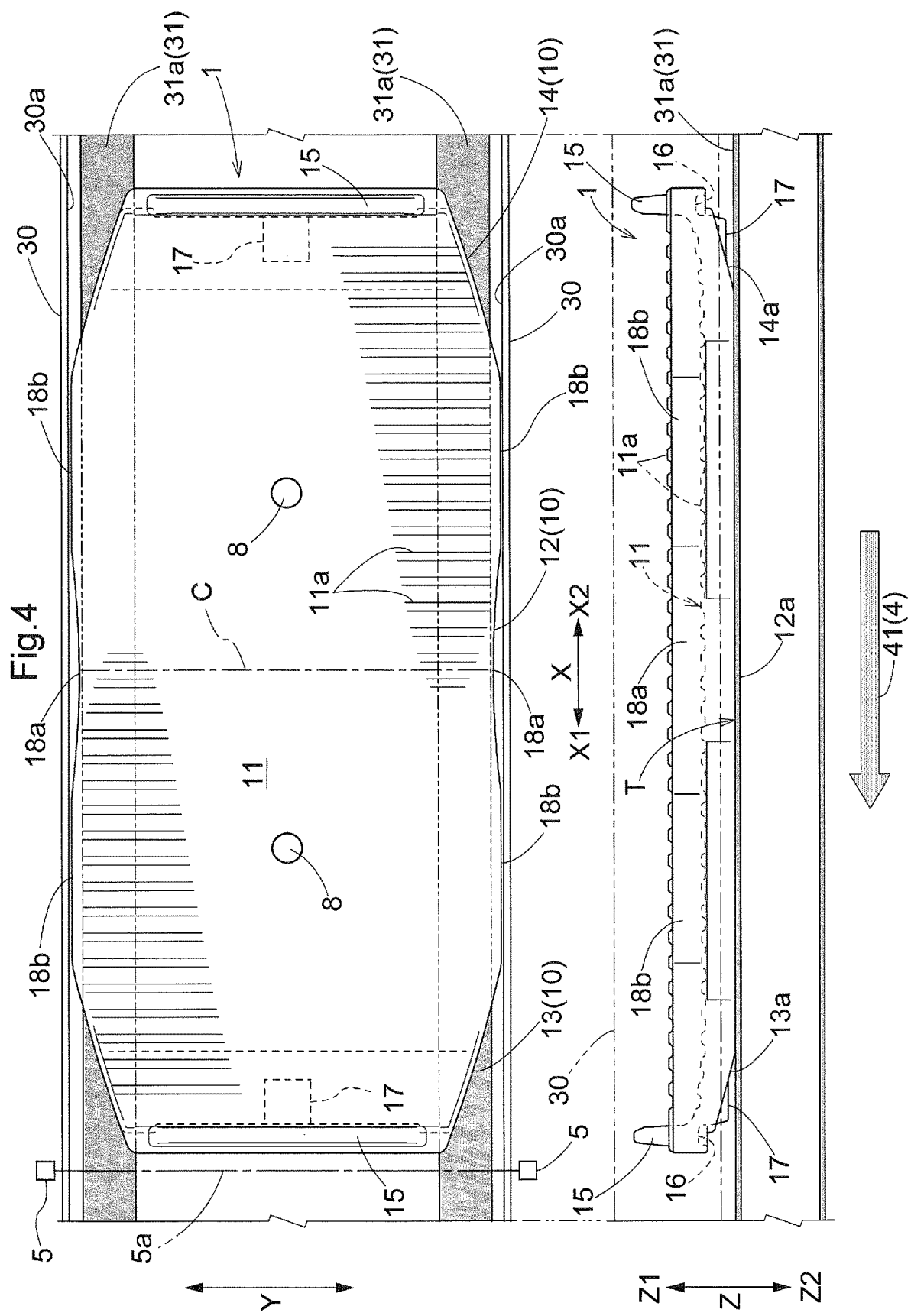
FIG. 4 includes a plan view and a side view of the first tray.
Figure 8:
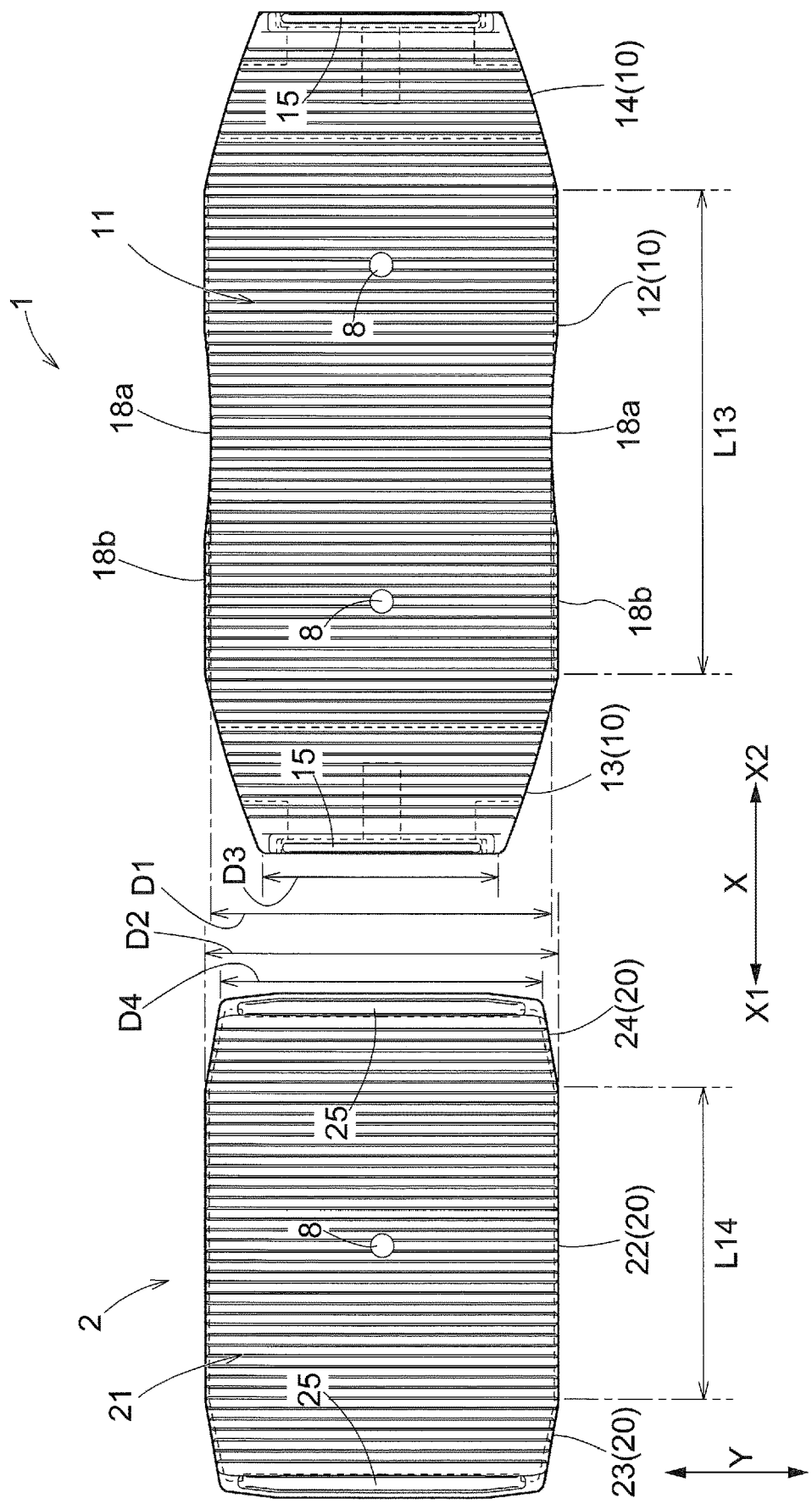
FIG. 8 is a diagram showing a comparison of shapes of the first tray and a second tray in a plan view.
Figure 9:
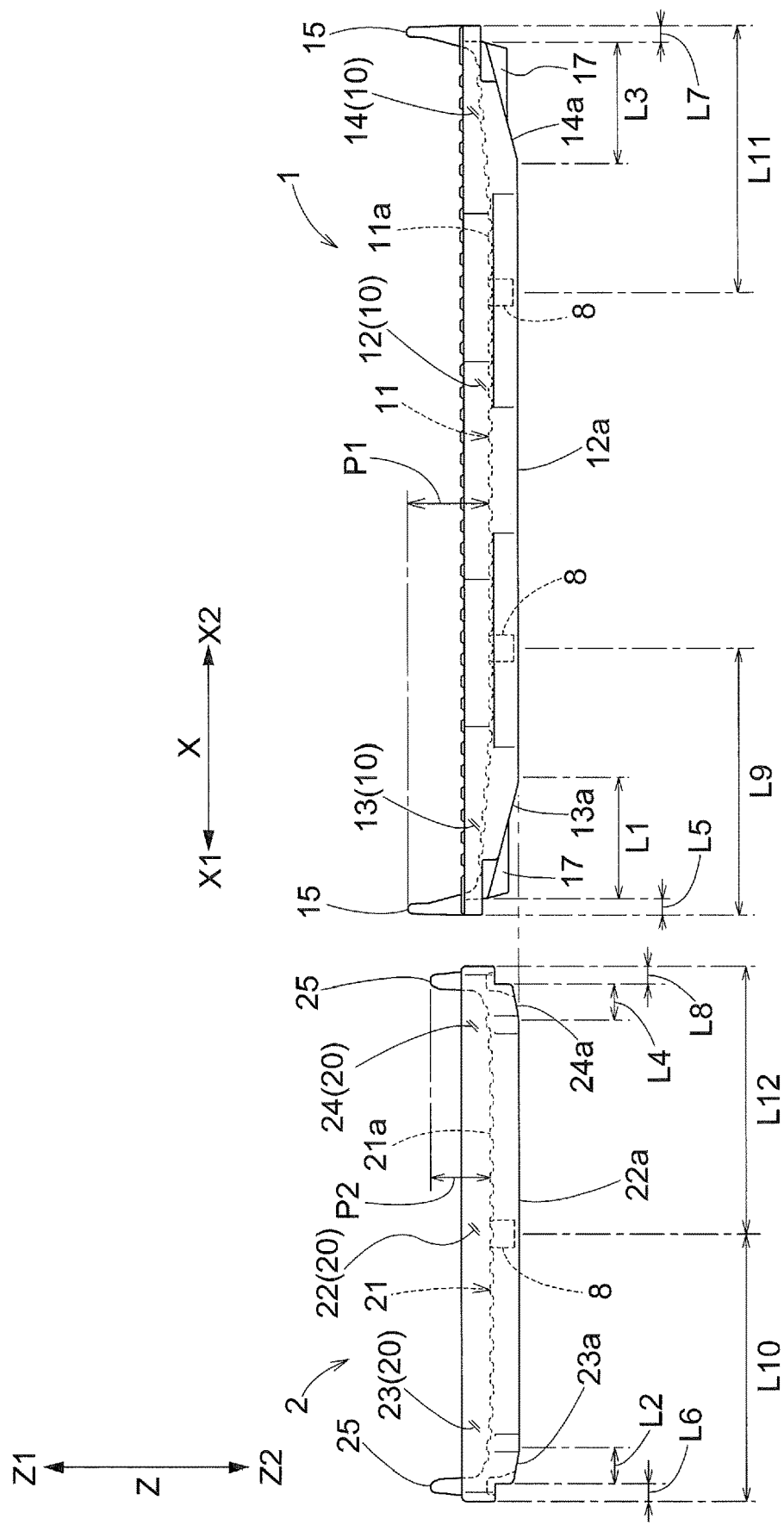
FIG. 9 is a diagram showing a comparison of shapes of the first tray and the second tray in a side view.

As shown in FIGS. 2 to 4, the first tray 1 includes a first main body section 10 that is plate-shaped. The upper surface (the surface facing an upward side Z1) of the first main body section 10 is used as a first placement surface 11 on which an article 9 (see FIG. 1) is placeable. Note that the upward side Z1 is the side that faces upward in an up-down direction Z (vertical direction), and a later-described downward side Z2 is the side that faces downward in the up-down direction Z. As shown in FIGS. 8 and 9, a second tray 2 includes a plate-shaped second main body section 20 having a shorter length in a front-rear direction X than the first main body section 10. The upper surface of the second main body section 20 is used as a second placement surface 21 on which an article 9 (see FIG. 1) is placeable. As shown in FIG. 1, the first tray 1 is transported along a transport route 4 by transport devices 3, and the second tray 2 is also transported along the transport route 4 by the transport devices 3. The first tray 1 and the second tray 2 are used to transport articles 9 such as pieces of baggage (e.g., suitcases) placed thereon at an airport, for example. The first tray 1 is for transporting an elongated article 9 (e.g., a golf bag) that cannot be placed on the second tray 2. In the present embodiment, the first main body section 10 corresponds to the "main body section", and the first placement surface 11 corresponds to the "placement surface".

Figure 5:
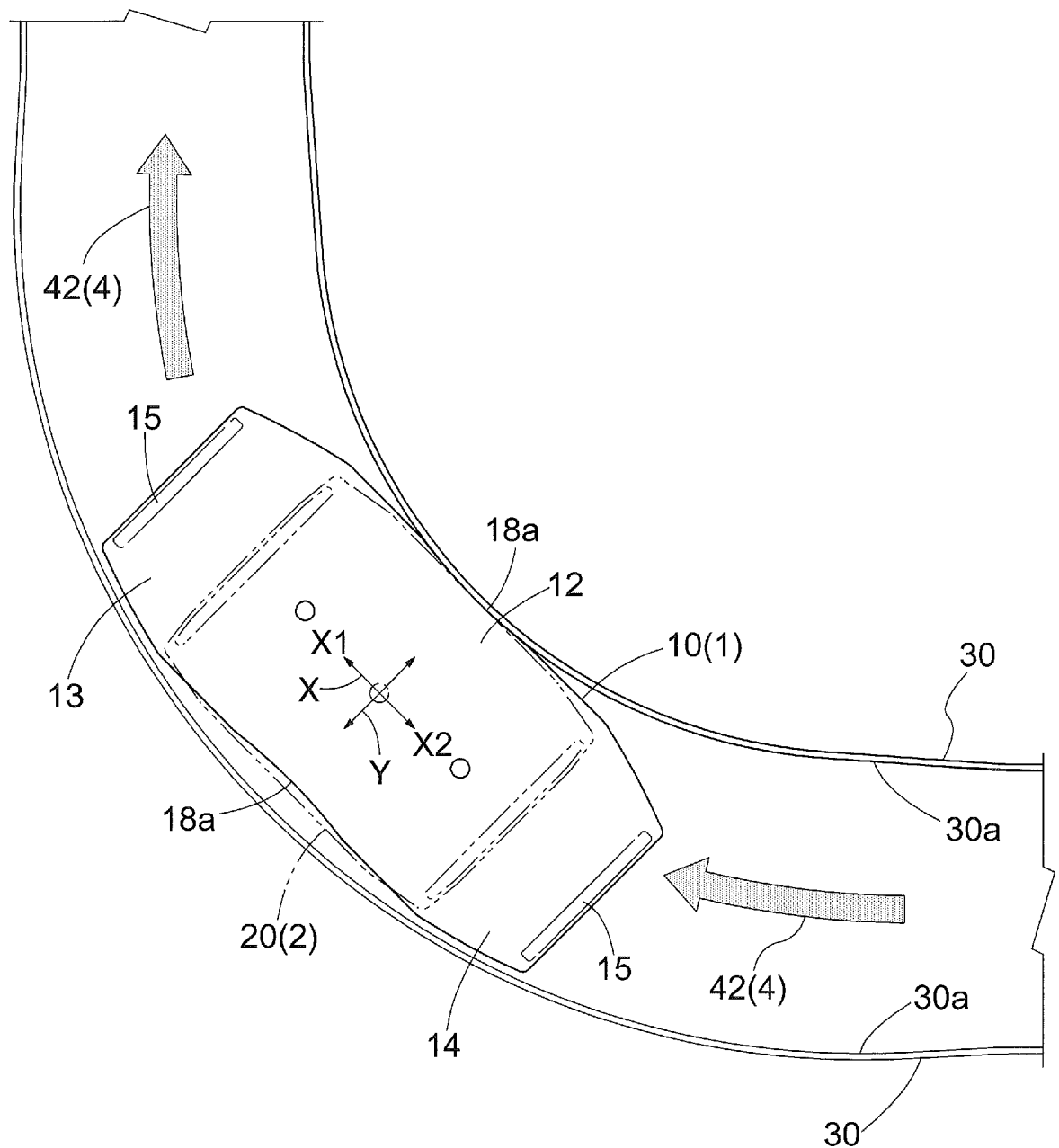
FIG. 5 is a plan view of the first tray in a curved route section.

Here, as shown in FIG. 4, the front-rear direction X is the direction extending along the transport route 4. In other words, the first tray 1 is arranged such that the front-rear direction X of the first tray 1 extends along the transport route 4, and the second tray 2 is arranged such that the front-rear direction X of the second tray 2 extends along the transport route 4. As shown in FIG. 1, the transport route 4 includes a curved route section 42 that is shaped as curved line in a plan view (in a view along the up-down direction Z). At each point along the curved route section 42, the direction extending along a tangent line in plan view at a corresponding point when representing the transport route 4 with a curve is a direction extending along the transport route 4 (i.e., is the front-rear direction X). In other words, as shown in FIG. 5, the first tray 1 is arranged such that, at each point on the curved route section 42, the front-rear direction X of the first tray 1 extends along the tangent line at the corresponding point on the curved route section 42, and the second tray 2 is arranged such that, at each point on the curved route section 42, the front-rear direction X of the second tray 2 extends along the tangent line at the corresponding point on the curved route section 42. Also, as shown in FIGS. 4 and 5, a width direction Y is a direction intersecting the front-rear direction X in a plan view (more specifically, is a direction orthogonal to the front-rear direction X). At locations where the transport route 4 extends along a horizontal plane H, the front-rear direction X and the width direction Y are both horizontal directions extending along the horizontal plane H. The front-rear direction X corresponds to the longitudinal direction of the first tray 1 and the second tray 2 in a plan view, and the width direction Y corresponds to the lateral direction of the first tray 1 and the second tray 2 in a plan view.

As shown in FIG. 1, the transport facility 100 is a facility that includes the first tray 1 and the transport devices 3, and the first tray 1 is transported along the transport route 4 by the transport devices 3. In the present embodiment, the transport facility 100 further includes the second tray 2, and the first tray 1 and the second tray 2 are transported along the transport route 4 by the transport devices 3. A transport facility 100 that includes the first tray 1 and the transport devices 3 (and furthermore the second tray 2 in the present embodiment) is also disclosed in this specification.

As shown in FIGS. 1 and 5, the transport devices 3 each include guide walls 30 at least in the curved route section 42. The guide walls 30 extend along the edges on the two sides, with respect to the width direction Y, of the transport route 4 and include guiding surfaces 30a that face inward in the width direction Y (see FIGS. 4 and 5). In the present embodiment, the transport route 4 includes a straight route section 41 that extends in a straight line in a plan view, and as shown in FIGS. 1 and 4, the transport device 3 includes the guide walls 30 in the straight route section 41 as well. The guide walls 30 have a height according to which the guiding surfaces 30a come into contact with the side surfaces of the first tray 1 and the second tray 2, and the guiding surfaces 30a restrict the movement of the first tray 1 and the second tray 2 toward both sides in the width direction Y as the trays move along the transport route 4. As shown in FIG. 4, the ends of the guide walls 30 on the upward side Z1 are higher than (on the upward side Z1 relative to) the first placement surface 11, and the guide walls 30 also have a function of suppressing the case where an article 9 placed on the first placement surface 11 slides off the first tray 1 in the width direction Y. Similarly, the ends of the guide walls 30 on the upward side Z1 are higher than (on the upward side Z1 relative to) the second placement surface 21, and the guide walls 30 also have a function of suppressing the case where an article 9 placed on the second placement surface 21 slides off the second tray 2 in the width direction Y.

As shown in FIG. 1, in the present embodiment, the transport devices 3 include a first transport device 31 and a second transport device 32. The first transport device 31 is a device for transporting the first tray 1 (and furthermore the second tray 2 in the present embodiment) in the straight route section 41, and the second transport device 32 is a device for transporting the first tray 1 (and furthermore the second tray 2 in the present embodiment) in the curved route section 42. Note that the second transport device 32 is not shown in FIG. 5.

Although the configuration of the first transport device 31 is not limited to this, as shown in FIGS. 1 and 4, in this example, the first transport device 31 includes two belts 31a (one example of a transport mechanism) spaced apart in the width direction Y, and the first tray 1 and the second tray 2 are transported while being supported on both sides in the width direction Y by the two belts 31a. Each of the belts 31a is wound around a plurality of pulleys 31b (see FIG. 6), and the first transport device 31 rotates driving pulleys 31b to drive (circulate) the two belts 31a, thus transporting the first tray 1 and the second tray 2 placed on the two belts 31a. In this example, a plane that includes the upper surfaces of the two belts 31a defines a transport surface T of the first transport device 31.

Although the configuration of the second transport device 32 is not limited to this, as shown in FIG. 1, in this example, the second transport device 32 includes inner peripheral rollers 32a and outer peripheral rollers 32b that are spaced apart in the width direction Y, and the first tray 1 and the second tray 2 are transported while being supported on both sides in the width direction Y by the inner peripheral rollers 32a and the outer peripheral rollers 32b. The inner peripheral rollers 32a are arranged side by side along the transport direction on the circumferentially inward side (the side closer to the turning center) relative to the center of the curved route section 42 in the width direction Y, and the outer peripheral rollers 32b are arranged side by side along the transport direction on the circumferentially outward side (the side distant from the turning center) relative to the center of the curved route section 42 in the width direction Y. The second transport device 32 rotates driving rollers (either the inner peripheral rollers 32a or the outer peripheral rollers 32b, or both of them) to transport the first tray 1 or the second tray 2 placed on the inner peripheral rollers 32a and the outer peripheral rollers 32b. In this example, a plane that includes the upper ends of the inner peripheral rollers 32a and the outer peripheral rollers 32b defines a transport surface T of the second transport device 32.

As shown in FIG. 2, in the present embodiment, first ridges 11a, which are ridges that project to the upward side Z1 and extend in the width direction Y, are formed on the upper surface of the first main body section 10 with gaps therebetween in the front-rear direction X. The first placement surface 11 is formed by the set of upper surfaces of the first ridges 11a arranged side by side in the front-rear direction X. Also, as shown in FIG. 9, in the present embodiment, second ridges 21a, which are ridges that project to the upward side Z1 and extend in the width direction Y, are formed on the upper surface of the second main body section 20 with gaps therebetween in the front-rear direction X. The second placement surface 21 is formed by the set of upper surfaces of the second ridges 21a arranged side by side in the front-rear direction X. By forming the first ridges 11a on the upper surface of the first main body section 10, it is possible to suppress the case where an article 9 placed on the first placement surface 11 moves in the front-rear direction X on the first placement surface 11, and by forming the second ridges 21a on the upper surface of the second main body section 20, it is possible to suppress the case where an article 9 placed on the second placement surface 21 moves in the front-rear direction X on the second placement surface 21.

In the present embodiment, the first placement surface 11 is inclined toward the downward side Z2 while extending toward the central section in the front-rear direction X. In the side view of the first tray 1 shown in FIG. 4, as indicated by the dashed line showing the upper surface of the first main body section 10 in the central section in the width direction Y, in this example, in at least the central section in the width direction Y, the first placement surface 11 is inclined toward the downward side Z2 while extending toward the central section in the front-rear direction X. Also, in this example, in an intermediate section excluding the sections on both sides in the front-rear direction X (i.e., in a section including the central section), the first placement surface 11 has a uniform height along the front-rear direction X, whereas in the sections on both sides in the front-rear direction X (i.e., in sections including the end sections on both sides), the first placement surface 11 is inclined toward the downward side Z2 while extending toward the central section in the front-rear direction X. As shown in FIG. 9, in the present embodiment, the second placement surface 21 is inclined similarly to the first placement surface 11, and is only different with respect to the sizes in the front-rear direction X. Due to the first placement surface 11 being inclined as described above, it is possible to suppress the case where an article 9 placed on the first placement surface 11 moves in the front-rear direction X on the first placement surface 11, and due to the second placement surface 21 being inclined as described above, it is possible to suppress the case where an article 9 placed on the second placement surface 21 moves in the front-rear direction X on the second placement surface 21.

In the present embodiment, as shown in FIG. 2, the first placement surface 11 is inclined toward the downward side Z2 while extending toward the central section in the width direction Y. In this example, over the entire range in the front-rear direction X, the first placement surface 11 is inclined toward the downward side Z2 while extending toward the central section in the width direction Y. Also, in the present embodiment, the second placement surface 21 is inclined similarly to the first placement surface 11. Due to the first placement surface 11 being inclined as described above, it is possible to suppress the case where an article 9 placed on the first placement surface 11 moves in the width direction Y on the first placement surface 11, and due to the second placement surface 21 being inclined as described above, it is possible to suppress the case where an article 9 placed on the second placement surface 21 moves in the width direction Y on the second placement surface 21.

As shown in FIGS. 2 and 3, the first main body section 10 includes a first intermediate section 12, a first front section 13 adjacent to the first intermediate section 12 on a front side X1 in the front-rear direction X, and a first rear section 14 adjacent to the first intermediate section 12 on a rear side X2 in the front-rear direction X. The front side X1 is the side facing forward in the front-rear direction X (i.e., the downstream side of the transport route 4), and the rear side X2 is the side facing rearward in the front-rear direction X (i.e., the upstream side of the transport route 4). The first intermediate section 12, the first front section 13, and the first rear section 14 (and furthermore later-described first end stoppers 15 in the present embodiment) are formed as a single piece by an integral molding technique (e.g., a molding technique in which a foaming resin such as foaming polypropylene is heated and foamed). In the present embodiment, the first intermediate section 12 corresponds to the "intermediate section", the first front section 13 corresponds to the "front section", and the first rear section 14 corresponds to the "rear section".

As shown in FIG. 4, the first intermediate section 12 has a rectangular shape (including a square shape) in a plan view, the first front section 13 is shaped as a trapezoid that becomes smaller in the width direction Y while extending toward the front side X1 in a plan view, and the first rear section 14 is shaped as a trapezoid that becomes smaller in the width direction Y while extending toward the rear side X2 in a plan view. Here, "rectangular in a plan view" means that the external shape in a plan view is rectangular or approximately rectangular overall, and "trapezoidal in a plan view" means that the external shape in a plan view is trapezoidal or approximately trapezoidal overall. As will be described later, in the present embodiment, the first intermediate section 12 includes a constricted section 18a, and the outer shape of the first intermediate section 12 in a plan view is approximately rectangular. Also, in the present embodiment, the length of the first intermediate section 12 in the front-rear direction X is greater than the length of the first intermediate section 12 in the width direction Y, and the first intermediate section 12 is rectangular in a plan view.

As shown in FIGS. 3 and 4, the bottom surface (the surface facing the downward side Z2) of the first intermediate section 12 includes a first reference surface section 12a shaped as a flat surface extending along the transport surface T, the bottom surface of the first front section 13 includes a first front inclined surface section 13a that is inclined relative to the first reference surface section 12a so as to approach the upward side Z1 while extending toward the front side X1, and the bottom surface of the first rear section 14 includes a first rear inclined surface section 14a that is inclined relative to the first reference surface section 12a so as to approach the upward side Z1 while extending toward the rear side X2. In this example, as shown in FIG. 4, the section on the rear side X2 of the bottom surface of the first front section 13 and the section on the front side X1 of the bottom surface of the first rear section 14 are shaped as flat surfaces that extend along the transport surface T (i.e., flat surfaces that are continuous with the first reference surface section 12a). With the exception of the later-described transport surface angle change section 40, the first reference surface section 12a is in contact with the transport surface T while the first tray 1 is transported by the transport device 3 (see FIG. 4). In the present embodiment, the first reference surface section 12a corresponds to the "reference surface section", the first front inclined surface section 13a corresponds to the "front inclined surface section", and the first rear inclined surface section 14a corresponds to the "rear inclined surface section".

As shown in FIGS. 2 and 4, a first end stopper 15 that projects to a position on the upward side Z1 relative to the first placement surface 11 is formed at each of the two end sections of the first main body section 10 in the front-rear direction X. Specifically, one first end stopper 15 is formed at the end section of the first front section 13 on the front side X1, and another one is formed at the end section of the first rear section 14 on the rear side X2. As shown in FIG. 4, the first end stoppers 15 extend along the width direction Y in a plan view. The two end sections in the width direction Y of each of the first end stoppers 15 are arranged at the same position, with respect to the front-rear direction X, as the central section of the first end stopper 15 in the width direction Y. As an alternative to this configuration, a configuration is possible in which the two side portions in the width direction Y of each of the first end stoppers 15 extend inward in the front-rear direction X (toward the center of the first tray 1 in the front-rear direction X) while extending outward in the width direction Y (away from the center of the first tray 1 in the width direction Y), and the two end sections in the width direction Y of each of the first end stoppers 15 are inward, with respect to the front-rear direction X, of the central section of the first end stopper 15 in the width direction Y, for example. In the present embodiment, the first end stoppers 15 correspond to the "end stoppers".

Figure 7:
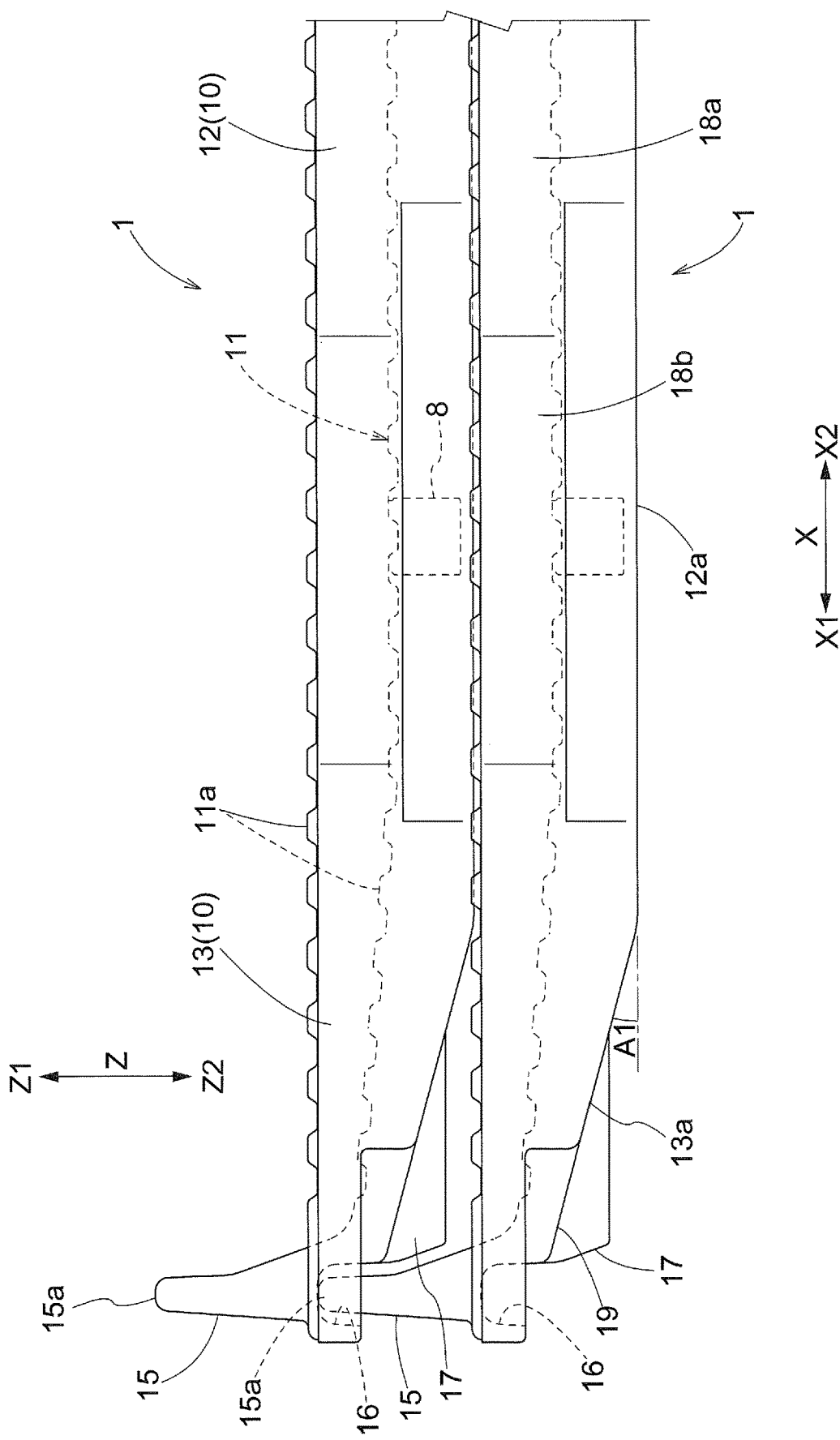
FIG. 7 is an enlarged side view of first trays in a stacked state.

As shown in FIG. 3, in the present embodiment, the portions of the bottom surface of the first main body section 10 that correspond to the formation positions of the first end stoppers 15 are each provided with a recess 16 that is recessed toward the upward side Z1 and is shaped to allow an upper end section 15a of another first end stopper 15 to be fitted therein. Specifically, one recess 16 is formed in the end section on the front side X1 of the bottom surface of the first front section 13, and another one is formed in the end section on the rear side X2 of the bottom surface of the first rear section 14. Accordingly, as shown in FIG. 7, if the two first end stoppers 15 formed in a first tray 1 on the downward side Z2 are fitted into the recesses 16 formed in a first tray 1 on the upward side Z1, it is possible to stack those two first trays 1 (specifically, empty first trays 1 on which no articles 9 are placed). Note that as shown in FIG. 3, in the present embodiment, recesses (clamp target portions 19) that allow the first tray 1 to be clamped by a stacking device are formed at the four corners of the bottom surface of the first main body section 10 (specifically, the two end sections in the width direction Y of each of the two end sections in the front-rear direction X), and first trays 1 can be stacked and unstacked by inserting four clamping portions (claw portions) of the stacking device into the corresponding clamp target portions 19.

As shown in FIGS. 8 and 9, the second main body section 20 includes a second intermediate section 22, a second front section 23 adjacent to the second intermediate section 22 on a front side X1 in the front-rear direction X, and a second rear section 24 adjacent to the second intermediate section 22 on a rear side X2 in the front-rear direction X. The second intermediate section 22, the second front section 23, and the second rear section 24 (and furthermore later-described second end stoppers 25 in the present embodiment) are formed as a single piece by an integral molding technique (e.g., a molding technique in which a foaming resin such as foaming polypropylene is heated and foamed). As shown in FIG. 4, the second intermediate section 22 has a rectangular shape in a plan view, the second front section 23 is shaped as a trapezoid that becomes smaller in the width direction Y while extending toward the front side X1 in a plan view, and the second rear section 24 is shaped as a trapezoid that becomes smaller in the width direction Y while extending toward the rear side X2 in a plan view.

As shown in FIG. 9, the bottom surface of an intermediate portion in the front-rear direction X (specifically, the second intermediate section 22) of the second main body section 20 includes a second reference surface section 22a shaped as a flat surface extending along the transport surface T, the bottom surface of a portion on the front side X1 (specifically, the second front section 23) of the second main body section 20 includes a second front inclined surface section 23a that is inclined relative to the second reference surface section 22a so as to approach the upward side Z1 while extending toward the front side X1, and the bottom surface of a portion on the rear side X2 (specifically, the second rear section 24) of the second main body section 20 includes a second rear inclined surface section 24a that is inclined relative to the second reference surface section 22a so as to approach the upward side Z1 while extending toward the rear side X2. With the exception of the later-described transport surface angle change section 40, the second reference surface section 22a is in contact with the transport surface T while the second tray 2 is transported by the transport device 3.

As shown in FIG. 9, a second end stopper 25 that projects to a position on the upward side Z1 relative to the second placement surface 21 is formed at each of the two end sections of the second main body section 20 in the front-rear direction X. Specifically, one second end stopper 25 is formed in the end section of the second front section 23 on the front side X1, and another one is formed in the end section of the second rear section 24 on the rear side X2. A first height P1, which is the height of each of the first end stoppers 15 from the first placement surface 11, is greater than a second height P2, which is the height of each of the second end stoppers 25 from the second placement surface 21. In the present embodiment, the first end stoppers 15 formed on the two sides in the front-rear direction X have the same height as each other from the first placement surface 11, and the second end stoppers 25 formed on the two sides in the front-rear direction X have the same height as each other from the second placement surface 21. Note that in FIG. 9, the height of the first placement surface 11, which is the reference for the first height P1, is the height of the central sections of the first placement surface 11 in the front-rear direction X and the width direction Y, and the height of the second placement surface 21, which is the reference for the second height P2, is the height of the central sections of the second placement surface 21 in the front-rear direction X and the width direction Y. In the present embodiment, the height of the central sections of the first placement surface 11 in the front-rear direction X and the width direction Y is equal to the height of the central sections of the second placement surface 21 in the front-rear direction X and the width direction Y.

In the present embodiment, the first tray 1 includes a portion on the front side X1 and a portion on the rear side X2 relative to a center position C in the front-rear direction X (see FIG. 4), and such portions have shapes that are mirror-symmetrical to each other with respect to a plane of symmetry orthogonal to the front-rear direction X at the center position C. The second tray 2 has a similar configuration in this respect. Accordingly, in FIG. 9 that will be referenced later, a first length L1 is equal to a third length L3, a second length L2 is equal to a fourth length L4, a fifth length L5 is equal to a seventh length L7, a sixth length L6 is equal to an eighth length L8, a ninth length L9 is equal to an eleventh length L11, and a tenth length L10 is equal to a twelfth length L12. In the present embodiment, the first tray 1 includes a portion on a first side in the width direction Y and a portion on a second side in the width direction Y relative to the center position in the width direction Y, and such portions have shapes that are mirror-symmetrical to each other with respect to a plane of symmetry orthogonal to the width direction Y at the center position. The second tray 2 has a similar configuration in this respect. Due to the first tray 1 and the second tray 2 being formed in this way, the first tray 1 and the second tray 2 have no directionality in the front-rear direction X, and either side in the front-rear direction X can be the front side X1.

Figure 6:
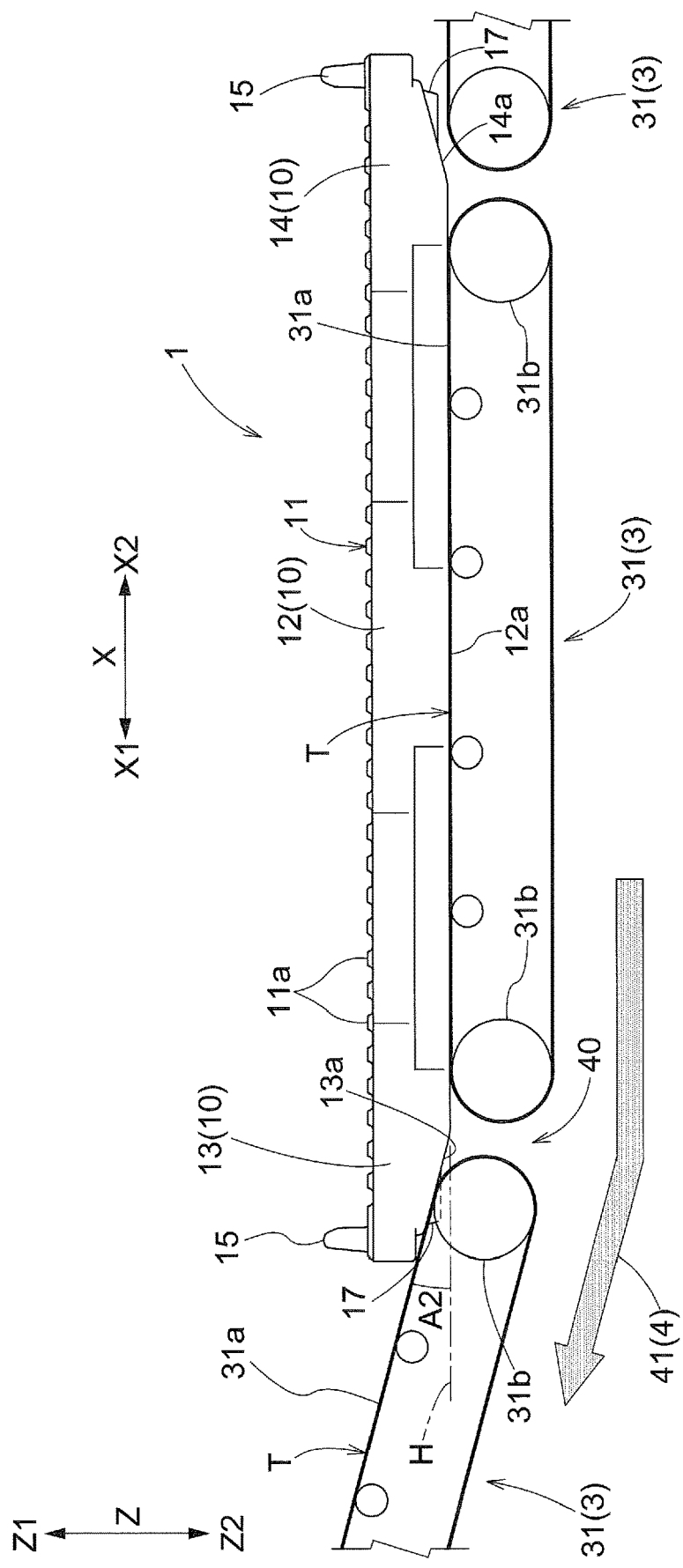
FIG. 6 is a side view of the first tray in a transport surface angle change section.

As shown in FIG. 6, in the present embodiment, the transport route 4 (here, the straight route section 41) includes the transport surface angle change section 40 in which the angle of the transport surface T relative to the horizontal plane H changes. In this specification, the angle of the transport surface T relative to the horizontal plane H is defined such that the angle of the transport surface T relative to the horizontal plane H is negative when inclined downward, and the angle of the transport surface T relative to the horizontal plane H is positive when inclined upward. The transport surface angle change section 40 shown in FIG. 6 is a transport surface angle change section 40 in which the angle of the transport surface T changes to a larger angle (specifically, changes from 0 degrees to 15 degrees). In other words, in the example shown in FIG. 6, an intersection angle A2 of the transport surface T in the transport surface angle change section 40 is 15 degrees. The intersection angle A2 is the angle of the transport surface T on the downstream side (front side X1) of the transport surface angle change section 40 (15 degrees in the example shown in FIG. 6) relative to the angle of the transport surface T on the upstream side (rear side X2) of the transport surface angle change section 40 (0 degrees in the example shown in FIG. 6). Of course, the intersection angle A2 may be an angle other than 15 degrees, such as 20 degrees or less.

When the first tray 1 passes through the transport surface angle change section 40, the posture of the first tray 1 changes from a first posture, in which the first reference surface section 12a is in contact with the transport surface T on the upstream side of the transport surface angle change section 40 (the posture of the first tray 1 shown in FIG. 6), to a second posture, in which the first reference surface section 12a is in contact with the transport surface T on the downstream side of the transport surface angle change section 40. While the posture of the first tray 1 changes in this way (specifically, before and after the posture of the first tray 1 changes from the first posture), as shown in FIG. 6, the first front inclined surface section 13a (specifically, the portions of the first front inclined surface section 13a on the two sides in the width direction Y) is in contact with the transport surface T on the downstream side of the transport surface angle change section 40. Also, although not shown, while the posture of the first tray 1 changes from the first posture to the second posture (specifically, before and after the posture of the first tray 1 changes to the second posture), the first rear inclined surface section 14a (specifically, the portions of the first rear inclined surface section 14a on the two sides in the width direction Y) is in contact with the transport surface T on the upstream side of the transport surface angle change section 40. Due to the first front inclined surface section 13a and the first rear inclined surface section 14a being in contact with the transport surface T (here, the upper surface of the belt 31a) in this way, the area of contact between the lower surface of the first main body section 10 and the transport surface T is likely to be appropriately ensured while the posture of the first tray 1 changes.

In the present embodiment, the first front inclined surface section 13a and the first rear inclined surface section 14a are inclined at the same angle relative to the first reference surface section 12a. Also, the inclination angle A1 (see FIG. 7) of the first front inclined surface section 13a and the first rear inclined surface section 14a relative to the first reference surface section 12a corresponds to the intersection angle A2 of the transport surface T in the transport surface angle change section 40 in which the change in the angle of the transport surface T (specifically the change in the angle of the transport surface T to a larger angle) is the largest in the transport route 4. Here, "the inclination angle A1 corresponds to the intersection angle A2" means that the inclination angle A1 is an angle that is set based on the intersection angle A2, and is a concept that includes both the case where the inclination angle A1 is equal to the intersection angle A2 and the case where the inclination angle A1 is different from the intersection angle A2 by a set angle. The set angle in the latter case is set in consideration of the tension of the belts 31a, for example. The transport surface angle change section 40 shown in FIG. 6 is the transport surface angle change section 40 in which the change in the angle of the transport surface T is the largest in the transport route 4, and in the example shown in FIG. 6, the inclination angle A1 (see FIG. 7) is equal to the intersection angle A2 of the transport surface T in the transport surface angle change section 40.

In the example is shown in the plan view of FIG. 4, the transport route 4 includes a sensor 5 for detecting the positions of the first tray 1 and the second tray 2 (positions in the front-rear direction X). The sensor 5 is configured to detect the first tray 1 and the second tray 2 by projecting detection light 5a in the width direction Y, and in this example, is a light-obstruction type of photoelectric switch (photoelectric sensor) that detects the first tray 1 and the second tray 2 based on the absence of the detection light 5a. The arrival of the leading end of the first tray 1 (the end on the front side X1) can be detected by the sensor 5 based on the positional relationship in the front-rear direction X between the position of the leading end of the first tray 1 on the front side X1 and the detection target portion of the first tray 1 that is detected by the sensor 5, and the arrival of the leading end of the second tray 2 can be similarly detected by the sensor 5. In the present embodiment, the positions of the first tray 1 and the second tray 2 are managed by a control device that controls the transportation operation of the transport devices 3 (specifically, a host controller that issues commands to device controllers provided in the transport devices 3), and this control device is configured to correct the positions of the first tray 1 and the second tray 2 that are being managed, based on information indicating the arrival times of the first tray 1 and the second tray 2 (specifically, the arrival times of the leading ends thereof) detected by the sensor 5. The information detected by the sensor 5 is used when controlling the stop positions of the first tray 1 and the second tray 2, for example. The positional relationship in the front-rear direction X between the leading end position on the front side X1 of the first tray 1 and the detection target portion of the first tray 1 that is detected by the sensor 5 is assumed to be the same or approximately the same as the positional relationship in the front-rear direction X between the leading end position on the front side X1 of the second tray 2 and the detection target portion of the second tray 2 that is detected by the sensor 5, thus making it possible to simplify the control configuration and control logic for stopping the trays at a target position at which the leading end does not protrude beyond a desired position. Specifically, in the case of performing control to stop a tray by starting deceleration at the timing when the arrival of the tray is detected by the sensor 5, regardless of whether the target tray is a first tray 1 or a second tray 2, the tray can be stopped at the target position (at which the leading end does not protrude beyond a desired position) without changing the deceleration time.

In the present embodiment, as will be described below, projections 17 are formed as detection target portions on the first front inclined surface section 13a and the first rear inclined surface section 14a, thus making it possible to deem the two aforementioned positional relationships the same or approximately the same. As shown in FIGS. 3 and 4, in the present embodiment, the central sections in the width direction Y of the first front inclined surface section 13a and the first rear inclined surface section 14a are each provided with a projection 17 that projects to a position on the downward side Z2 relative to the portions on the two sides in the width direction Y. The bottom surface of the projection 17 extends parallel with the first reference surface section 12a at the same height as the first reference surface section 12a or on the upward side Z1 thereof (in the present embodiment, on the upward side Z1 relative to the first reference surface section 12a). Note that the bottom surface of the projection 17 may be arranged so as not to extend parallel with the first reference surface section 12a (e.g., may be arranged so as to extend along a plane inclined relative to the first reference surface section 12a).

In the present embodiment, the end surface on the front side X1 of the projection 17 formed on the first front inclined surface section 13a is inclined toward the rear side X2 while extending toward the downward side Z2 (see FIGS. 4 and 7), and the end surface on the rear side X2 of the projection 17 formed on the first rear inclined surface section 14a is inclined toward the front side X1 while extending toward the downward side Z2 (see FIG. 4). In the present embodiment, as described above, the recesses 16 are formed on the two sides in the front-rear direction X in the bottom surface of the first main body section 10, and thus the projection 17 formed on the first front inclined surface section 13a is located on the rear side X2 of the recess 16 on the front side X1 (see FIGS. 4 and 7), and the projection 17 formed on the first rear inclined surface section 14a is located on the front side X1 of the recess 16 on the rear side X2 (see FIG. 4).

Although not shown, the sensor 5 is configured to project the detection light 5a at a height at which the projection 17 is formed. For this reason, as shown in FIG. 9, letting the fifth length L5 be the length (separation distance) along the front-rear direction X between the end section of the first tray 1 on the front side X1 and the projection 17 formed on the first front inclined surface section 13a, the sensor 5 detects a position shifted to the rear side X2 by the fifth length L5 from the leading end position on the front side X1 of the first tray 1. Note that since the end surface on the front side X1 of the projection 17 formed on the first front inclined surface section 13a is inclined toward the rear side X2 while extending toward the downward side Z2, the position detected by the sensor 5 can be a position that is further shifted to the rear side X2 by a predetermined length from the position shifted to the rear side X2 by the fifth length L5 from the leading end position on the front side X1 of the first tray 1. Also, in FIG. 9, the seventh length L7 is the length along the front-rear direction X between the end section of the first tray 1 on the rear side X2 and the projection 17 formed on the first rear inclined surface section 14a.

On the other hand, the bottom surface of the second tray 2 (specifically, the second front section 23) includes a first face (facing the front side X1) that is at a height at which the detection light 5a is projected and that extends toward the upward side Z1 from the end section on the front side X1 of the second front inclined surface section 23a. For this reason, as shown in FIG. 9, letting the sixth length L6 be the length along the front-rear direction X between the first face and the end section on the front side X1 of the second tray 2, the sensor 5 detects a position shifted to the rear side X2 by the sixth length L6 from the leading end position on the front side X1 of the second tray 2. Note that the bottom surface of the second tray 2 (specifically, the second rear section 24) includes a second face (facing the rear side X2) that is at a height at which the detection light 5a is projected and that extends toward the upward side Z1 from the end section on the rear side X2 of the second rear inclined surface section 24a, and in FIG. 9, the eighth length L8 is the length along the front-rear direction X between the second face and the end section on the rear side X2 of the second tray 2.

In the present embodiment, the projections 17 are formed such that the fifth length L5 matches or substantially matches the sixth length L6, and therefore, as described above, the positional relationship in the front-rear direction X between the leading end position on the front side X1 of the first tray 1 and the detection target portion of the first tray 1 that is detected by the sensor 5 can be assumed to be the same or approximately the same as the positional relationship in the front-rear direction X between the leading end position on the front side X1 of the second tray 2 and the detection target portion of the second tray 2 that is detected by the sensor 5. Note that due to forming the projections 17 on the first front inclined surface section 13a and the first rear inclined surface section 14a, as shown in FIG. 6, when the first tray 1 passes through the transport surface angle change section 40, the projection 17 enters a region on the downward side Z2 of the transport surface T, but since the projections 17 are formed in the central sections in the width direction Y of the first front inclined surface section 13a and the first rear inclined surface section 14a, the transport devices 3 (specifically, the motor for rotating the pulley 31b, decelerator, and the like) can be easily provided so as to not interfere with the projections 17.

As shown in FIG. 4, in the present embodiment, a constricted section 18a, which is recessed toward the central section in the width direction Y while extending toward the center position C in the front-rear direction X, is provided in each of the surfaces on the two sides in the width direction Y in the center region in the front-rear direction X of the first intermediate section 12 (the region including the central section in the front-rear direction X). In this example, the constricted sections 18a are each formed such that the shape of the side surface of the portion of the first intermediate section 12 provided with the constricted section 18a is arc-shaped in a plan view. As shown in FIGS. 2 to 4, portions of the two side surfaces in the width direction Y of the first intermediate section 12 on the front side X1 and the rear side X2 relative to the constricted section 18a are shaped as flat surfaces extending orthogonal to the width direction Y, and these portions constitute guided sections 18b, which are guided by coming into contact with the guiding surfaces 30a. Although this will not be described in detail, if the guided sections 18b are provided on the two sides of the constricted section 18a in the front-rear direction X, when the posture of the first tray 1 is switched from the horizontal posture to an inclined posture (a posture in which the first side in the width direction Y is located on the downward side Z2 relative to the second side in the width direction Y) in order to slide an article 9 placed on the first tray 1 to the first side in the width direction Y in order to be discharged, the first tray 1 can be appropriately maintained in the inclined posture by supporting, from the downward side Z2, the guided sections 18b on the two sides of the constricted sections 18a in the front-rear direction X.

As shown in FIG. 8, in the present embodiment, a first dimension D1, which is the minimum dimension in the width direction Y of the first intermediate section 12 (intermediate section) in the portion where the constricted sections 18a are formed, is shorter than a second dimension D2, which is the dimension in the width direction Y of the central section in the front-rear direction X of the second main body section 20. In the present embodiment, the dimension in the width direction Y of the second intermediate section 22 is uniform along the front-rear direction X, and the second dimension D2 is equal to the dimension in the width direction Y of the second intermediate section 22. Also, in the present embodiment, the dimension in the width direction Y of the first intermediate section 12 in the portions provided with the guided sections 18b is equal to the second dimension D2. In other words, in the present embodiment, the maximum dimension in the width direction Y of the first tray 1 (in this example, the dimension in the width direction Y of the first intermediate section 12 in the portions provided with the guided sections 18b) is equal to the maximum dimension in the width direction Y of the second tray 2 (in this example, the dimension in the width direction Y of the second intermediate section 22).

As described above, the first front section 13 of the first tray 1 is shaped as a trapezoid that becomes smaller in the width direction Y while extending toward the front side X1 in a plan view, and the first rear section 14 of the first tray 1 is shaped as a trapezoid that becomes smaller in the width direction Y while extending toward the rear side X2 in a plan view. For this reason, the radial width of the movement locus (the difference between the inner diameter and the outer diameter of the movement locus) of the first tray 1 in the curved route section 42 can be kept small, and as shown in FIG. 5, the movement locus of the first tray 1 in the curved route section 42 can be brought closer to the movement locus of the second tray 2 in the same curved route section 42. Note that the movement locus of the first tray 1 is the space in which the first tray 1 moves (i.e., the set of movement loci of all portions of the first tray 1), and the movement locus of the second tray 2 is the space in which the second tray 2 moves (i.e., the set of movement loci of all portions of the second tray 2). In the present embodiment, due to forming the constricted sections 18a in the first intermediate section 12 of the first tray 1, the movement locus of the first tray 1 in the curved route section 42 can be brought even closer to the movement locus of the second tray 2 in the same curved route section 42. As shown in FIG. 5, in the curved route section 42, the first tray 1 moves along the curved route section 42 in a state where one side surface of the first intermediate section 12 of the first tray 1 is guided by coming into contact with the guiding surface 30a of the guide wall 30 on the circumferentially inward side and furthermore the side surfaces of the first front section 13 and the first rear section 14 are guided by coming into contact with the guiding surface 30a of the guide wall 30 on the circumferentially outward side.

As shown in FIG. 8, in the present embodiment, the dimension in the width direction Y of the end section on the front side X1 of the first main body section 10 is smaller than the dimension in the width direction Y of the end section on the front side X1 of the second main body section 20, and the dimension in the width direction Y of the end section on the rear side X2 of the first main body section 10 is smaller than the dimension in the width direction Y of the end section on the rear side X2 of the second main body section 20. In the present embodiment, the dimension in the width direction Y of the end section on the front side X1 of the first main body section 10 is equal to the dimension in the width direction Y of the end section on the rear side X2 of the first main body section 10, and this dimension is a third dimension D3 in FIG. 8. Also, in the present embodiment, the dimension in the width direction Y of the end section on the front side X1 of the second main body section 20 is equal to the dimension in the width direction Y of the end section on the rear side X2 of the second main body section 20, and this dimension is a fourth dimension D4 in FIG. 8.

Letting the upper base be the shorter one of the two parallel sides (bases) of the trapezoid, the length of the upper base of the trapezoid formed by the outer shape of the first front section 13 in a plan view is assumed to be the dimension in the width direction Y of the end section on the front side X1 of the first main body section 10, and the length of the upper base of the trapezoid formed by the outer shape of the first rear section 14 in a plan view is assumed to be the dimension in the width direction Y of the end section on the rear side X2 of the first main body section 10.

Also, the length of the upper base of the trapezoid formed by the outer shape of the second front section 23 in a plan view is assumed to be the dimension in the width direction Y of the end section on the front side X1 of the second main body section 20, and the length of the upper base of the trapezoid formed by the outer shape of the second rear section 24 in a plan view is assumed to be the dimension in the width direction Y of the end section on the rear side X2 of the second main body section 20. Note that if the outer shape in a plan view is approximately trapezoidal overall, the length (along the width direction Y) of the portion that can be deemed to be the upper base is assumed to be the length of the upper base of the trapezoid. In the example shown in FIG. 8, the outer shapes of the second front section 23 and the second rear section 24 in a plan view are overall approximately trapezoidal (specifically, shaped as a trapezoid whose side corresponding to the upper base is bent at two points), and the fourth dimension D4 is the length of the portion that can be deemed to be the upper base.

As shown in FIG. 8, in the present embodiment, the length of the first intermediate section 12 in the front-rear direction X (a thirteenth length L13) is greater than the length of the first front section 13 in the front-rear direction X, and is greater than the length of the first rear section 14 in the front-rear direction X. Also, in the present embodiment, the length of the first intermediate section 12 in the front-rear direction X is greater than the length of the second intermediate section 22 in the front-rear direction X (a fourteenth length L14), and in this example, the length of the first intermediate section 12 in the front-rear direction X matches or substantially matches the length of the second tray 2 overall in the front-rear direction X. Furthermore, as shown in FIG. 8, in the present embodiment, the length of the first front section 13 in the front-rear direction X is greater than the length of the second front section 23 in the front-rear direction X, and the length of the first rear section 14 in the front-rear direction X is greater than the length of the second rear section 24 in the front-rear direction X. In the present embodiment, the length of the first front section 13 in the front-rear direction X is equal to the length of the first rear section 14 in the front-rear direction X, and the length of the second front section 23 in the front-rear direction X is equal to the length of the second rear section 24 in the front-rear direction X. Letting the height of the trapezoid be the distance between the two parallel sides (bases), the height of the trapezoid formed by the outer shape of the first front section 13 in a plan view is the length of the first front section 13 in the front-rear direction X, and the height of the trapezoid formed by the outer shape of the first rear section 14 in a plan view is the length of the first rear section 14 in the front-rear direction X. Also, the height of the trapezoid formed by the outer shape of the second front section 23 in a plan view is the length of the second front section 23 in the front-rear direction X, and the height of the trapezoid formed by the outer shape of the second rear section 24 in a plan view is the length of the second rear section 24 in the front-rear direction X. Note that if the outer shape in a plan view is approximately trapezoidal overall, the height of the trapezoid is the distance (along the front-rear direction X) between portions that can be deemed to be the two parallel sides.

As shown in FIG. 9, the first length L1 is the length of the first front inclined surface section 13a in the front-rear direction X, the second length L2 is the length of the second front inclined surface section 23a in the front-rear direction X, the third length L3 is the length of the first rear inclined surface section 14a in the front-rear direction X, and the fourth length L4 is the length of the second rear inclined surface section 24a in the front-rear direction X, and, in the present embodiment, the first length L1 is greater than the second length L2, and the third length L3 is greater than the fourth length L4.

As shown in FIG. 8, in the present embodiment, an identification information holding section 8 is provided in the central section in the width direction Y of the first tray 1 and the second tray 2. As shown in FIG. 9, the identification information holding sections 8 are provided on the downward side Z2 relative to the first placement surface 11 and the second placement surface 21. The identification information holding sections 8 provided in the first tray 1 each house a storage medium such as an RF (Radio Frequency) tag holding identification information of the first tray 1, thus holding the identification information of the first tray 1. Also, the identification information holding section 8 provided in the second tray 2 houses a storage medium such as an RF (Radio Frequency) tag holding identification information of the second tray 2, thus holding the identification information of the second tray 2. The first tray 1 is provided with two identification information holding sections 8 respectively on the front side X1 and the rear side X2 of the central section in the front-rear direction X, and the second tray 2 is provided with one identification information holding section 8 in the central section in the front-rear direction X.

As shown in FIG. 9, the ninth length L9 is the length along the front-rear direction X between the end section on the front side X1 of the first tray 1 and the identification information holding section 8 provided on the front side X1 of the central section in the front-rear direction X of the first tray 1, the tenth length L10 is the length along the front-rear direction X between the end section on the front side X1 of the second tray 2 and the identification information holding section 8 of the second tray 2, the eleventh length L11 is the length along the front-rear direction X between the end section on the rear side X2 of the first tray 1 and the identification information holding section 8 provided on the rear side X2 of the central section in the front-rear direction X of the first tray 1, and the twelfth length L12 along the front-rear direction X between the end section on the rear side X2 of the second tray 2 and the identification information holding section 8 of the second tray 2, and, in the present embodiment, the ninth length L9 matches or substantially matches the tenth length L10, and the eleventh length L11 matches or substantially matches the twelfth length L12. As described above, the leading end positions on the front side X1 of the first tray 1 and the second tray 2 can be detected with use of the sensor 5, and therefore due to the ninth length L9 matching or substantially matching the tenth length L10 as described above, regardless of whether the tray whose identification information is to be read is the first tray 1 or the second tray 2, the identification information can be read by the reading device at the same timing after the arrival of the tray is detected by the sensor 5. As a result, it is possible to reduce the load on the reading system. Note that as an alternative to the example shown in FIG. 9, a configuration is possible in which the ninth length L9 and the tenth length L10 are different, and the eleventh length L11 and the twelfth length L12 are different.

Other Embodiments

The following describes other embodiments of the trays and the transport facility.

(1) In the above embodiment, an example is described in which the first dimension D1, which is the minimum dimension in the width direction Y of the first intermediate section 12 in the portion where the constricted section 18a is formed, is shorter than the second dimension D2, which is the dimension in the width direction Y of the central section of the second main body section 20 in the front-rear direction X. However, the present disclosure is not limited to this configuration, and a configuration is possible in which the first dimension D1 is equal to or longer than the second dimension D2. In this case, the dimension in the width direction Y of the first intermediate section 12 in the portions provided with the guided sections 18b is longer than the second dimension D2.

(2) In the above embodiment, an example is described in which the constricted sections 18a are formed in the first intermediate section 12. However, the present disclosure is not limited to this configuration, and a configuration is also possible in which the constricted sections 18a are not formed in the first intermediate section 12.

(3) In the above embodiment, an example is described in which the first height P1, which is the height of the first end stopper 15 from the first placement surface 11, is greater than the second height P2, which is the height of the second end stopper 25 from the second placement surface 21. However, the present disclosure is not limited to this configuration, and a configuration is possible in which the first height P1 is equal to the second height P2, for example. Note that a configuration is also possible in which the first end stopper 15 and the second end stopper 25 are not provided.

(4) In the above embodiment, an example is described in which the recesses 16 are formed in the bottom surface of the first main body section 10. However, the present disclosure is not limited to this configuration, and a configuration is also possible in which the recesses 16 are not formed in the bottom surface of the first main body section 10.

(5) In the above embodiment, an example is described in which the projections 17 are formed in the central sections in the width direction Y of the first front inclined surface section 13a and the first rear inclined surface section 14a. However, the present disclosure is not limited to this configuration, and a configuration is also possible in which the first front inclined surface section 13a and the first rear inclined surface section 14a are not provided with the projections 17.

(6) In the above embodiment, an example is described in which the first placement surface 11 is inclined toward the downward side Z2 while extending toward the central section in the front-rear direction X. However, the present disclosure is not limited to this configuration, and a configuration is also possible in which the height of the first placement surface 11 is uniform along the front-rear direction X over the entire range in the front-rear direction X.

(7) In the above embodiment, an example is described in which the dimension in the width direction Y of the end section on the front side X1 of the first main body section 10 is smaller than the dimension in the width direction Y of the end section on the front side X1 of the second main body section 20, and the dimension in the width direction Y of the end section on the rear side X2 of the first main body section 10 is smaller than the dimension in the width direction Y of the end section on the rear side X2 of the second main body section 20. However, the present disclosure is not limited to this configuration, and a configuration is possible in which the dimension in the width direction Y of the end section on the front side X1 of the first main body section 10 is equal to or greater than the dimension in the width direction Y of the end section on the front side X1 of the second main body section 20, and the dimension in the width direction Y of the end section on the rear side X2 of the first main body section 10 is equal to or greater than the dimension in the width direction Y of the end section on the rear side X2 of the second main body section 20, for example.

(8) In the above embodiment, an example is described in which the first length L1, which is the length of the first front inclined surface section 13a in the front-rear direction X, is greater than the second length L2, which is the length of the second front inclined surface section 23a in the front-rear direction X, and the third length L3, which is the length of the first rear inclined surface section 14a in the front-rear direction X, is greater than the fourth length L4, which is the length of the second rear inclined surface section 24a in the front-rear direction X. However, the present disclosure is not limited to this configuration, and a configuration is also possible in which the first length L1 is equal to or smaller than the second length L2, and the third length L3 is equal to smaller than the fourth length L4, for example.

(9) In the above embodiment, an example is described in which the inclination angle A1 of the first front inclined surface section 13a and the first rear inclined surface section 14a relative to the first reference surface section 12a corresponds to the intersection angle A2 of the transport surface T in the transport surface angle change section 40 in which the change in the angle of the transport surface T is the largest in the transport route 4. However, the present disclosure is not limited to this configuration, and a configuration is also possible in which the inclination angle A1 does not correspond to the intersection angle A2 of the transport surface T in the transport surface angle change section 40 in which the change in the angle of the transport surface T is the largest in the transport route 4. For example, a configuration is also possible in which the inclination angle A1 is greater than the intersection angle A2 of the transport surface T in the transport surface angle change section 40 in which the change in the angle of the transport surface T is the largest in the transport route 4.

(10) In the above embodiment, an example is described in which the transport route 4 includes the transport surface angle change section 40. However, the present disclosure is not limited to this configuration, and a configuration is also possible in which the transport route 4 does not include the transport surface angle change section 40. In this case, in contrast with the above embodiment, a configuration is possible in which the bottom surface of the first front section 13 does not include the first front inclined surface section 13a, and furthermore the bottom surface of the first rear section 14 does not include the first rear inclined surface section 14a, and a configuration is possible in which the bottom surface of the second front section 23 does not include the second front inclined surface section 23a, and furthermore the bottom surface of the second rear section 24 does not include the second rear inclined surface section 24a.

(11) In the above embodiment, an example is described in which the first tray 1 and the second tray 2 are transported along the transport route 4 by the transport device 3. However, the present disclosure is not limited to this configuration, and a configuration is also possible in which only the first tray 1 is transported along the transport route 4 by the transport device 3.

(12) Note that the configurations disclosed in each of the above-described embodiments may be applied in combination with configurations disclosed in other embodiments (including combinations between embodiments described as other embodiments) as long as no contradiction arises. Regarding other configurations as well, the embodiments disclosed in this specification are merely examples in all respects. Accordingly, various modifications can be made as appropriate without departing from the scope of the present disclosure.

Overview of Embodiments

The following describes an overview of the trays and the transport facility described above.

A tray according to an aspect of the present disclosure is a tray configured to be transported along a transport route by a transport device, the tray including: a main body section that is plate-shaped, wherein with a front-rear direction being a direction along the transport route, and a width direction being a direction intersecting the front-rear direction in a plan view, the transport route includes a curved route section shaped as a curved line in a plan view, the transport device includes a pair of guide walls in at least the curved route section, the guide walls each extending along a corresponding edge, with respect to the width direction, of the transport route and including a guiding surface facing inward in the width direction, the main body section has an upper surface used as a placement surface on which an article is placeable, the main body section includes: an intermediate section; a front section adjacent to the intermediate section on a front side in the front-rear direction; and a rear section adjacent to the intermediate section on a rear side in the front-rear direction, the intermediate section is rectangular in a plan view, the front section is shaped as a trapezoid that becomes smaller in the width direction while extending toward the front side in a plan view, and the rear section is shaped as a trapezoid that becomes smaller in the width direction while extending toward the rear side in a plan view.

According to this configuration, the intermediate section is rectangular in a plan view, thus making it possible to appropriately ensure the placement surface for placement of an article. Also, according to this configuration, both the front section and the rear section are shaped as a trapezoid that becomes smaller in the width direction while extending toward the leading end side in the front-rear direction in a plan view, and therefore the radial width of the movement locus of the tray in the curved route section can be kept smaller than in the case where the front section and the rear section are rectangular in a plan view. Accordingly, it is possible to increase the total length of the tray while keeping a low extent of increase in the radial width of the movement locus of the tray in the curved route section. Note that in this configuration, the movement of the tray in the curved route section can be guided by the guide walls of the transport device, but by keeping a small radial width for the movement locus of the tray in the curved route section, it is also possible to keep a small distance between the guide walls in the width direction and suppress an increase in the size of the transport device.

Here, it is preferable that the transport route further includes a transport surface angle change section in which an angle of a transport surface relative to a horizontal plane changes, the intermediate section has a bottom surface including a reference surface section shaped as a flat surface extending along the transport surface, the front section has a bottom surface including a front inclined surface section that is inclined relative to the reference surface section in such a manner as to approach an upward side while extending toward the front side, and the rear section has a bottom surface including a rear inclined surface section that is inclined relative to the reference surface section in such a manner as to approach the upward side while extending toward the rear side.

If the angle of the transport surface relative to the horizontal plane is defined such that the angle of the transport surface relative to the horizontal plane is negative when inclined downward, and the angle of the transport surface relative to the horizontal plane is positive when inclined upward, then the angle of the transport surface changes to a larger angle in a transport surface angle change section in which the transport surface changes from a posture parallel with the horizontal plane to an upward inclined posture, and in a transport surface angle change section in which the transport surface changes from a downward inclined posture to a posture parallel with the horizontal plane, for example. According to the above configuration, while the posture of the tray changes in such a transport surface angle change section in which the angle of the transport surface changes to a larger angle, a sufficient area of contact between the lower surface of the main body section and the transport surface is likely to be appropriately ensured due to the existence of the front inclined surface section and the rear inclined surface section. Accordingly, the tray is more likely to be stably transported in the transport surface angle change section than in the case where the front inclined surface section and the rear inclined surface section are not provided. Note that in a constant transport surface angle section in which the angle of the transport surface does not change, a sufficient area of contact between the lower surface of the main body section and the transport surface can be appropriately ensured by contact between the reference surface section and the transport surface.

In the configuration in which the bottom surface of the front section includes the front inclined surface section and the bottom surface of the rear section includes the rear inclined surface section as described above, it is preferable that the front inclined surface section and the rear inclined surface section are each inclined relative to the reference surface section by an inclination angle corresponding to an intersection angle of the transport surface in the transport surface angle change section in which a change in an angle of the transport surface is largest in the transport route.

In the tray of the present disclosure, the front section and the rear section are shaped as a trapezoid that becomes smaller in the width direction while extending toward the leading end side in the front-rear direction in a plan view. For this reason, in the case where the transport device includes two transport mechanisms arranged separately on the two sides in the width direction for example, when the tray passes through a transport surface angle change section in which the angle of the transport surface changes to a larger angle, there is a possibility that the leading end of the tray on the front side or the rear side enters a region below the transport surface between the two transport mechanisms. If the leading end of the tray enters a region below the transport surface, there is a risk of the leading end of the tray interfering with a device located below the transport surface (e.g., a decelerator or motor of the transport device).

Regarding this point, according to the above configuration, the inclination angle of the front inclined surface section and the rear inclined surface section relative to the reference surface section correspond to the intersection angle of the transport surface in the transport surface angle change section in which the change in the angle of the transport surface is the largest in the transport route. For this reason, when the tray passes through the transport surface angle change section in which the change in the angle of the transport surface is the largest and the transport surface angle change section in which the change in the angle of the transport surface is comparatively smaller, the front inclined surface section and the rear inclined surface section come into contact with the transport surface, thus preventing the leading end of the tray from entering the region below the transport surface (or from entering such region to a large extent).

Also, it is preferable that the front inclined surface section and the rear inclined surface section each include, in a central section in the width direction, a projection projecting to a position on a downward side relative to portions on two sides in the width direction, and the projections each have a bottom surface extending parallel with the reference surface section at a height corresponding to the reference surface section or on the upward side of the reference surface section.

According to this configuration, in the case where the position of the tray is detected by a sensor and the operation of transporting the tray by the transport device is controlled accordingly (e.g., in the case of controlling the stop position of the tray), the projection is used as the detection target portion that is detected by the sensor. Since the position of the projection in the front-rear direction can be set relatively freely, in the case where the tray of the present disclosure (hereinafter referred to as the "first tray") can be added to an existing facility for transporting another tray (hereinafter referred to as the "second tray") having a shorter total length than the first tray for example, the projection can be provided at a position according to which the positional relationship in the front-rear direction between the leading end position of the tray and the detection target portion is the same or approximately the same for both the first tray and the second tray. In this manner, by making the positional relationship in the front-rear direction between the leading end position of the tray and the detection target portion the same or approximately the same for both the first tray and the second tray, it is possible to simplify the control configuration and control logic for the transport of the trays by the transport device, such as using the same deceleration time (the time from when a tray is detected by the sensor until when the tray stops) for both the first tray and the second tray in the case where the trays are to be stopped at a target position such that leading end does not protrude beyond a desired position, for example.

Note that according to the above configuration, the projections are provided in the central sections in the width direction of the front inclined surface section and the rear inclined surface section. For this reason, in the case where the transport device includes two transport mechanisms arranged separately on the two sides in the width direction for example, even if a projection enters the region below the transport surface when the tray passes through the transport surface angle change section, the projection is spaced apart from the two transport mechanisms, thus making it possible to avoid the case where the projection interferes with devices included in the transport mechanisms.

In the tray having any of the above configurations, it is preferable that the intermediate section includes, on each of surfaces on two sides in the width direction in a central region in the front-rear direction, a constricted section recessed in such a manner as to approach a central section in the width direction while extending toward a center position in the front-rear direction.

The inner diameter of the movement locus of the tray in the curved route section is determined according to the movement locus of a side surface in the width direction (specifically, the inner side surface) in the central region of the intermediate section in the front-rear direction. According to the above configuration, the constricted sections are formed in the surfaces on the two side in the width direction of the central region of the intermediate section in the front-rear direction, thus making it possible to obtain a smaller radial width for the movement locus of the tray in the curved route section than in the case where the constricted sections are not formed. Accordingly, even if the total length of the tray is lengthened, the radial width of the movement locus of the tray in the curved route section can be easily kept small.

Also, it is preferable that the main body section includes, in each of two end sections in the front-rear direction, an end stopper projecting to a position on an upward side of the placement surface.

According to this configuration, the end stoppers can suppress the case where an article placed on the tray slides off the tray in the front-rear direction during an increase or decrease in the transport speed of the tray or when the posture of the tray changes in the up-down direction.

In the configuration in which the end sections of the main body section on the two sides in the front-rear direction include the end stoppers as described above, it is preferable that the main body section has a bottom surface including, in each of two portions corresponding to formation positions of the end stoppers, a recess recessed toward the upward side and shaped to allow an upper end section of a corresponding one of the end stoppers to be fitted into the recess.

According to this configuration, trays (e.g., empty trays on which no article is placed) can be stacked by fitting the two end stoppers of a lower tray into the recesses of an upper tray. Accordingly, trays can be stacked stably.

In the tray having any of the above configurations, it is preferable that the placement surface is inclined in such a manner as to approach a downward side while extending toward a central section in the front-rear direction.

According to this configuration, it is possible to suppress the case where an article placed on the placement surface moves in the front-rear direction on the placement surface. Accordingly, it is possible to suppress the case where an article placed on the tray slides off the tray in the front-rear direction during an increase or decrease in the transport speed of the tray or when the posture of the tray changes in the up-down direction.

A transport facility according to an aspect of the present disclosure is a transport facility including: a first tray that is any of the trays described above; the transport device; and a second tray configured to be transported along the transport route by the transport device, wherein with the main body section being a first main body section, the second tray includes a plate-shaped second main body section having a shorter length in the front-rear direction than the first main body section.

As described above, it is possible to increase the total length of the first tray, which is the tray of the present disclosure, while also suppressing the extent of an increase in the radial width of the movement locus of the tray in the curved route section. For this reason, in the curved route section, the first tray can be transported closer to the movement locus of the second tray, which has a shorter total length than the first tray, and it is possible to more easily construct a transport facility that includes and transports both the first tray and the second tray as in this configuration.

Here, it is preferable that the first main body section includes an end section on the front side that has a smaller width in the width direction than an end section of the second main body section on the front side, and the first main body section includes an end section on the rear side that has a smaller width in the width direction than an end section of the second main body section on the rear side.

According to this configuration, it is possible to keep a small radial width for the movement locus of the first tray in the curved route section than in the case where the dimension in the width direction of the end section on the front side of the first main body section is the same as or larger than the dimension in the width direction of the end section on the front side of the second main body section, and the dimension in the width direction of the end section on the rear side of the first main body section is the same as or larger than the dimension in the width direction of the end section on the rear side of the second main body section. Accordingly, the first tray can be more easily transported closer to the movement locus of the second tray in the curved route section.

Also, it is preferable that the intermediate section has a bottom surface including a first reference surface section shaped as a flat surface extending along a transport surface of the transport device, the front section has a bottom surface including a first front inclined surface section that is inclined relative to the first reference surface section in such a manner as to approach an upward side while extending toward the front side, the rear section has a bottom surface including a first rear inclined surface section that is inclined relative to the first reference surface section in such a manner as to approach the upward side while extending toward the rear side, the second main body section includes, in an intermediate portion in the front-rear direction, a bottom surface including a second reference surface section shaped as a flat surface extending along the transport surface, the second main body section includes, in a portion on the front side, a bottom surface including a second front inclined surface section that is inclined relative to the second reference surface section in such a manner as to approach the upward side while extending toward the front side, the second main body section includes, in a portion on the rear side, a bottom surface including a second rear inclined surface section that is inclined relative to the second reference surface section in such a manner as to approach the upward side while extending toward the rear side, the first front inclined surface section has a longer length in the front-rear direction than the second front inclined surface section, and the first rear inclined surface section has a longer length in the front-rear direction than the second rear inclined surface section.

According to this configuration, the length in the front-rear direction of the first front inclined surface section is greater than the length in the front-rear direction of the second front inclined surface section, and the length in the front-rear direction of the first rear inclined surface section is greater than the length in the front-rear direction of the second rear inclined surface section, thus making it possible to make the first main body section longer in the front-rear direction than the second main body section while also preventing the first reference surface section from being excessively longer than the second reference surface section in the front-rear direction. Since the first reference surface section and the second reference surface section are in contact with the transport surface and receive transporting force from the transport device, preventing the first reference surface section from being excessively longer in the front-rear direction than the second reference surface section makes it easier for the first tray and the second tray to be transported by the same transport device in both a branching section and a merging section, for example. As a result, it becomes easier to construct a transport facility that includes and transports these two types of trays.

Also, it is preferable that the intermediate section includes, on each of surfaces on two sides in the width direction in a central region in the front-rear direction, a constricted section recessed in such a manner as to approach a central section in the width direction while extending toward a center position in the front-rear direction, and the intermediate section has, in a portion in which the constricted sections are formed, a minimum dimension in the width direction that is smaller than a width in the width direction of a central section of the second main body section in the front-rear direction.

According to this configuration, the radial width of the movement locus of the first tray in the curved route section can be made smaller than in the case where the minimum dimension in the width direction of the intermediate section in the portion provided with the constricted sections is the same as or longer than the dimension in the width direction of the central section of the second main body section in the front-rear direction. Accordingly, the first tray can be more easily transported closer to the movement locus of the second tray in the curved route section.

Also, it is preferable that the first main body section includes, in each of two end sections in the front-rear direction, a first end stopper projecting to a position on an upward side of a first placement surface that is the placement surface, the second main body section has an upper surface used as a second placement surface on which an article is placeable, the second main body section includes, in each of two end sections in the front-rear direction, a second end stopper projecting to a position on the upward side of the second placement surface, and the first end stopper projects from the first placement surface to a height higher than a height to which the second end stopper projects from the second placement surface.

In a transport surface angle change section in which the angle of the transport surface changes to a smaller angle (e.g., in a transport surface angle change section in which the transport surface changes from an upward inclined state to a posture parallel with the horizontal plane, or a transport surface angle change section in which the transport surface changes from a posture parallel with the horizontal plane to a downward inclined state), the posture of the tray changes relatively abruptly. Here, the first main body section is longer in the front-rear direction than the second main body section, and therefore when the posture of the tray changes, the amount of movement in the up-down direction of the end sections of the tray in the front-rear direction is greater in the case of the first tray than in the case of the second tray. For this reason, in such a transport surface angle change section, an article placed on the first tray is more likely to move a large amount in the up-down direction than an article placed on the second tray. According to the above configuration, the height of the first end stopper formed in the first main body section is larger than the height of the second end stopper formed in the second main body section, and therefore the case where an article placed on the first main body section slides off the first main body section in the front-rear direction in a curved route section can be suppressed more easily than in the case where the height of the first end stopper formed in the first main body section is smaller than or equal to the height of the second end stopper formed in the second main body section.

The tray and transport facility according to the present disclosure need only achieve at least one of the effects described above.

DESCRIPTION OF REFERENCE SIGNS

1 First tray (tray)
2 Second tray
3 Transport device
4 Transport route
9 Article
10 First main body section (main body section)
11 First placement surface (placement surface)
12 First intermediate section (intermediate section)
12a First reference surface section (reference surface section)
13 First front section (front section)
13a First front inclined surface section (front inclined surface section)
14 First rear section (rear section)
14a First rear inclined surface section (rear inclined surface section)
15 First end stopper (end stopper)
15a Upper end section
16 Recess
17 Projection
18a Constricted section
20 Second main body section
21 Second placement surface
22a Second reference surface section
23a Second front inclined surface section
24a Second rear inclined surface section
25 Second end stopper
30 Guide wall
30a Guiding surface
40 Transport surface angle change section
42 Curved route section
100 Transport facility
A1 Inclination angle
A2 Intersection angle
C Center position
D1 First dimension (minimum dimension in width direction of intermediate section in portion provided with constricted section)
D2 Second dimension (dimension in width direction of central section of second main body section in front-rear direction)
H Horizontal plane
L1 First length (length of first front inclined surface section in front-rear direction)
L2 Second length (length of second front inclined surface section in front-rear direction)
L3 Third length (length of first rear inclined surface section in front-rear direction)
L4 Fourth length (length of second rear inclined surface section in front-rear direction)
P1 First height (height of first end stopper from first placement surface)
P2 Second height (height of second end stopper from second placement surface)
T Transport surface
X Front-rear direction
X1 Front side
X2 Rear side
Y Width direction
Z1 Upward side
Z2 Downward side

The invention claimed is:

1. A transport facility comprising:
a tray; and
a transport device,
wherein:
the tray is configured to be transported along a transport route by the transport device,
the tray comprises a main body section that is plate-shaped,
a front-rear direction is a direction along the transport route, and a width direction is a direction intersecting the front-rear direction in a plan view,
the transport route includes a curved route section shaped as a curved line in a plan view,
the transport device comprises a pair of guide walls in at least the curved route section, the guide walls each extending along a corresponding edge, with respect to the width direction, of the transport route and including a guiding surface facing inward in the width direction,
the main body section has an upper surface used as a placement surface on which an article is placeable,
the main body section comprises:
an intermediate section;
a front section adjacent to the intermediate section on a front side in the front-rear direction; and
a rear section adjacent to the intermediate section on a rear side in the front-rear direction,
the intermediate section is rectangular in a plan view,
the front section is shaped as a trapezoid that becomes smaller in the width direction while extending toward the front side in a plan view, and
the rear section is shaped as a trapezoid that becomes smaller in the width direction while extending toward the rear side in a plan view.

2. The transport facility according to claim 1, wherein:
the transport route further includes a transport surface angle change section in which an angle of a transport surface relative to a horizontal plane changes,
the intermediate section has a bottom surface including a reference surface section shaped as a flat surface extending along the transport surface,
the front section has a bottom surface including a front inclined surface section that is inclined relative to the reference surface section in such a manner as to approach an upward side while extending toward the front side, and
the rear section has a bottom surface including a rear inclined surface section that is inclined relative to the reference surface section in such a manner as to approach the upward side while extending toward the rear side.

3. The transport facility according to claim 2,
wherein the front inclined surface section and the rear inclined surface section are each inclined relative to the reference surface section by an inclination angle corresponding to an intersection angle of the transport surface in the transport surface angle change section in which a change in an angle of the transport surface is largest in the transport route.

4. The transport facility according to claim 2, wherein:
the front inclined surface section and the rear inclined surface section each include, in a central section in the width direction, a projection projecting downward relative to portions on two sides in the width direction, and
the projections each have a bottom surface extending parallel with the reference surface section at a height corresponding to the reference surface section or on the upward side of the reference surface section.

5. The transport facility according to claim 1, wherein the intermediate section includes, on each of surfaces on two sides in the width direction in a central region in the front-rear direction, a constricted section recessed in such a manner as to approach a central section in the width direction while extending toward a center position in the front-rear direction.

6. The transport facility according to claim 1, wherein the main body section includes, in each of two end sections in the front-rear direction, an end stopper projecting upward relative to the placement surface.

7. The transport facility according to claim 6, wherein the main body section has a bottom surface including, in each of two portions corresponding to formation positions of the end stoppers, a recess recessed toward the upward side and shaped to allow an upper end section of a corresponding one of the end stoppers to be fitted into the recess.

8. The transport facility according to claim 1, wherein the placement surface is inclined in such a manner as to approach a downward side while extending toward a central section in the front-rear direction.

9. The transport facility according to claim 1 further comprising:
a first tray; and
a second tray configured to be transported along the transport route by the transport device,
wherein with the main body section being a first main body section, the second tray comprises a plate-shaped second main body section having a shorter length in the front-rear direction than the first main body section.

10. The transport facility according to claim 9, wherein:
the first main body section includes an end section on the front side that has a smaller width in the width direction than an end section of the second main body section on the front side, and
the first main body section includes an end section on the rear side that has a smaller width in the width direction than an end section of the second main body section on the rear side.

11. The transport facility according to claim 9, wherein:
the intermediate section has a bottom surface including a first reference surface section shaped as a flat surface extending along a transport surface of the transport device,
the front section has a bottom surface including a first front inclined surface section that is inclined relative to the first reference surface section in such a manner as to approach an upward side while extending toward the front side,
the rear section has a bottom surface including a first rear inclined surface section that is inclined relative to the first reference surface section in such a manner as to approach the upward side while extending toward the rear side,
the second main body section includes, in an intermediate portion in the front-rear direction, a bottom surface including a second reference surface section shaped as a flat surface extending along the transport surface,
the second main body section includes, in a portion on the front side, a bottom surface including a second front inclined surface section that is inclined relative to the second reference surface section in such a manner as to approach the upward side while extending toward the front side,
the second main body section includes, in a portion on the rear side, a bottom surface including a second rear inclined surface section that is inclined relative to the second reference surface section in such a manner as to approach the upward side while extending toward the rear side,
the first front inclined surface section has a longer length in the front-rear direction than the second front inclined surface section, and
the first rear inclined surface section has a longer length in the front-rear direction than the second rear inclined surface section.

12. The transport facility according to claim 9, wherein:
the intermediate section includes, on each of surfaces on two sides in the width direction in a central region in the front-rear direction, a constricted section recessed in such a manner as to approach a central section in the width direction while extending toward a center position in the front-rear direction, and
the intermediate section has, in a portion in which the constricted sections are formed, a minimum dimension in the width direction that is smaller than a width in the width direction of a central section of the second main body section in the front-rear direction.

13. The transport facility according to claim 9, wherein:
the first main body section includes, in each of two end sections in the front-rear direction, a first end stopper projecting upward relative to a first placement surface as the placement surface,
the second main body section has an upper surface used as a second placement surface on which an article is placeable,
the second main body section includes, in each of two end sections in the front-rear direction, a second end stopper projecting upward relative to the second placement surface, and
the first end stopper projects from the first placement surface to a height higher than a height to which the second end stopper projects from the second placement surface.

14. The transport facility according to claim 1, wherein in the curved route section, the tray moves along the curved route section in a state where a side surface of the intermediate section of the tray is guided by coming into contact with the guiding surface of the guide wall on a circumferentially inward side and side surfaces of the front section and the rear section are guided by coming into contact with the guiding surface of the guide wall on a circumferentially outward side.

* * * * *